United States Patent [19]
Patchett et al.

[11] 3,725,439
[45] Apr. 3, 1973

[54] 13-CARBOCYCLIC-3-KETO-4-GONENES

[75] Inventors: Arthur A. Patchett, Cranford; Thomas B. Windholz, Westfield, both of N.J.

[73] Assignee: Merck & Co., Inc., Rahway, N.J.

[22] Filed: Jan. 7, 1971

[21] Appl. No.: 104,760

[52] U.S. Cl.....260/397.4, 260/239.55 C, 260/397.5, 260/397.45
[51] Int. Cl............................................C07c 169/20
[58] Field of Search....................................260/397.4

[56] References Cited

UNITED STATES PATENTS 3,407,217   10/1968   Hughes et al......................260/397.4

*Primary Examiner*—Elbert L. Roberts
*Attorney*—Henry H. Bassford, Jr., Jerome J. Behan and I. Louis Wolk

[57] ABSTRACT

The invention disclosed herein relates to novel 3,17-bis-oxygenated-gonane compounds having unsaturation in ring A, and a carbocyclic nucleus attached to the C-13 carbon atom, and to the process of preparing these compounds by reacting a 2-carbocyclic substituted cyclopentane 1,3-dione with 6-methoxy-1-vinyl-1-hydroxy-tetrahydronaphthylidene to form a 3-methoxy-13-carbocyclic substituted gona-1,3,5,8(9)-14 pentaen-17-one, followed by reduction, if desired, of the double bonds in rings C and D, and also partial reduction of the aromatic A ring to form a $\Delta^4$ or $\Delta^{5(10)}$ - 3-keto analog. These novel ring A unsaturated 3,17-bis-oxygenated-13-carbocyclic substituted gonane compounds possess antiandrogenic activity, and also, particularly where the carbocyclic nucleus in the 13-position is a cyclopentyl radical, possess anti-progestational action.

23 Claims, No Drawings

13-CARBOCYCLIC-3-KETO-4-GONENES

This invention relates to novel 3,17-dioxygenated-A-ring unsaturated gonenes further characterized by the presence of a carbocyclic ring at the 13-position. It relates also to processes by which these valuable compounds are prepared and to intermediates useful for their preparation.

The physiologically active compounds of this invention may be represented by the formulas:

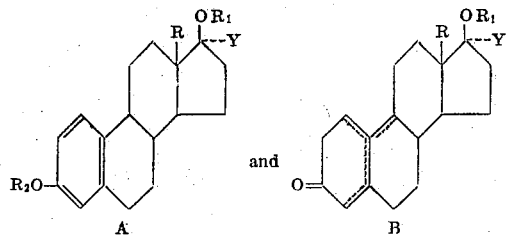

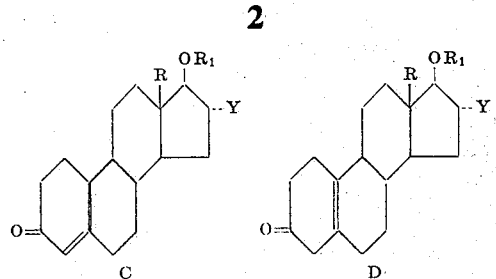

wherein R is a 5-membered or 6-membered carbocyclic ring, $R_1$ is hydrogen, hydrocarbon or substituted hydrocarbon, for example an aliphatic or substituted aliphatic radical including alkyl and aralkyl radicals such as methyl, ethyl, propyl, butyl, amyl, benzyl, 5-methyl-benzyl, cycloaliphatic, especially cycloalkyl radicals such as cyclopentyl, cyclohexyl and the like; or an acyl radical such as benzoyl, acetyl, propionyl, butyryl, caprylyl and the like; and $R_2$ is hydrogen or alkyl. Y is hydrogen or a saturated or unsaturated hydrocarbon or halogenated hydrocarbon side chain containing up to three carbon atoms such as ethynyl, vinyl, trifluoropropynyl, trifluorovinyl or haloethynyl such as chloro - or bromovinyl. The dotted lines at the 4-, 5- and 8-positions indicate the optional presence of a double bond at one or more of these positions. Of course if there are two double bonds in the molecule they cannot be attached to the same ring carbon.

Compounds within the purview of Formula B above may be more particularly represented by the formulas

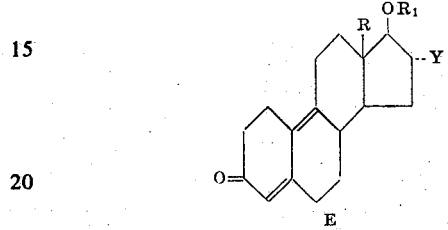

wherein R, $R_1$ and Y have the same meaning as above.

In the presently preferred route by which the compounds of Classes C, D and E are prepared, a series of closely related A-ring aromatic compounds are employed. Certain of them are novel and are within the scope of this invention. The following reaction sequence illustrates the preparation of the specific compound 3-methoxy-13-phenylgona-1,3,5,8(9)-tetraene-17-one (compound 6) a novel intermediate. Compounds 2, 3, 4 and 5 are also novel intermediates encompassed by this invention. Although the synthesis specifically illustrates 3-methoxy compounds, it will be understood that other 3-alkoxy intermediates, especially lower alkoxy such as an ethoxy or butoxy are also useful. For convenience the preferred compounds are 3-methoxy compounds.

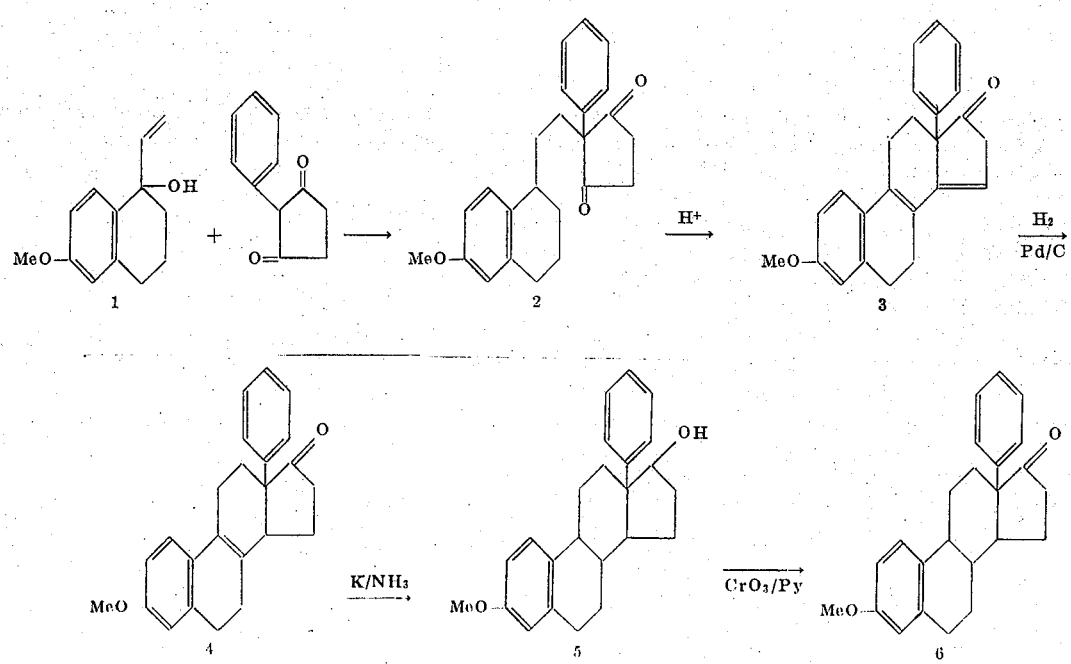

In the first step of this process, as illustrated, 2-phenyl-cyclopentane 1,3-dione is condensed with 1,2,3,4-tetrahydro-6-methoxy-1-vinyl-1-naphthol in a reaction inert organic solvent. Reaction is preferably effected in the presence of a catalyst. The catalyst, if utilized, may be acidic or basic. Especially convenient catalysts include nitrogenous bases such as trimethyl benzyl ammonium hydroxide or lower aliphatic acids such as acetic or propionic acid. From about 0.1 to about 0.15 moles of catalyst per mole of naphthol may be utilized.

With basic catalysts a mixture of t-butanolxylene is a convenient solvent system. With acidic catalysts, ether solvents such as dioxane or tetrahydrofuran may be used. The reaction may be conveniently carried out at from about 20°C. to 120°C. during a reaction period of from about 1 to 24 hours. Naturally the optimum reaction period will depend upon the selected temperature, but from the point of view of obtaining best yields within practical reaction periods it is preferred to carry out the reaction during a period of from 2 to 4 hours at temperatures ranging from 80°C. to 100°C.

The 2-(6-methoxy-1,2,3,4-tetrahydronaphthylideneethyl)-2-phenylcyclopentane-1,3-dione thus obtained is next cyclized in a reaction inert organic solvent suitably a lower alkanoic acid such as acetic or propionic acid to produce 3-methoxy-13-phenyl-gona-1,3,5,8(9),14(15)-pentaene-17-one. Reaction may be effected under the same temperature and time conditions as the previously described reaction except that better yields are obtained at somewhat lower reaction temperatures during a longer reaction period. The preferred conditions are 10 to 20 hours at 20°C. to 35°C. The preferred acids are strong organic acids such as benzene-sulfonic acid and p-toluenesulfonic acid, and these are employed in a mole ratio of from about 1.5:1 to about 2.5:1 based on the amount of tetrahydronaphthylidene.

Selective, catalytic hydrogenation in the presence of a noble metal catalyst effects reduction of the 14(15)-double bond to produce 3-methoxy-13-phenyl-gona-1,3,5,8(9)-tetraene-17-one. The preferred catalyst is 10 percent palladium on carbon, and this is employed in an amount of from about 5 to 15 percent by weight based on the weight of organic compound to be reduced. A reaction inert organic solvent such as benzene, toluene, dioxane or tetrahydrofuran is used and the reaction is carried out at substantially room temperature, i.e. about 25°C. to about 35°C. at atmospheric pressure until no more hydrogen is taken up. The reaction time will, of course, vary with the quantity of starting compound.

The double bond at the 8(9)-position is next reduced with simultaneous reduction of the 17-oxo group to produce 3-methoxy-13-phenyl-gona-1,3,5-triene-17β-ol. The preferred reducing agent is potassium in liquid ammonia. A large molar excess of metal, e.g. about 10 to about 20 equivalents per equivalent of steroid. An auxiliary reaction inert solvent such as tetrahydrofuran or dioxane may be employed. It is most convenient to operate at the reflux temperature of the ammonia but any temperature from about minus 20°C. to minus 70°C. may be employed. The reaction period is from about 1 to about 6 hours, optimum yields being obtained during a period of from 4 to 6 hours.

The 17β-hydroxy compound is oxidized to 3-methoxy-13-phenyl-gona-1,3,5-triene-17-one with a suitable oxidizing agent, for example, organic bases such as pyridine, γ-picoline, β-picoline, lutidines, or quinoline complexes with chromium trioxide. Of these the pyridine-chromium trioxide complex is preferred for convenience. The reaction is normally carried out at room temperature, i.e. 20°C. to 35°C. during a period of from about 10 to about 20 hours utilizing the chromium trioxide in about a 1:1 weight ratio with the steroid in about ten times the weight of organic base.

If desired, the 17-oxo-group may be reduced with a complex metal hydride, suitably sodium borohydride, lithium aluminum hydride, and the like prior to selective reduction of the 8(9)-double bond. The 3-methoxy-13-phenyl-gona-1,3,5,8(9)-tetraene-17β-ol (Compound 7), after reducing Δ8(9) bond, is reoxidized with, for example, the pyridine-chromium trioxide complex to produce Compound 6. This is not the referred route to Compound 6 since there is some decrease in yield. However, the 17β-hydroxy compound is a valuable intermediate for other reactions, as will be discussed in more detail below.

This is not the preferred route to Compound 6 since there is some decrease in yield. However, the 17β-hydroxy compound is a valuable intermediate for other reactions, as will be discussed in more detail below.

The reduction is normally carried out in a reaction inert solvent, suitably a lower alkanol such as methanol or ethanol at an elevated temperature, for example 50°C. to 65°C. for a period of from about 2 to about 6 hours utilizing at least an equimolar quantity of the hydride and preferably an excess of up to about 2 to 5 times the molar quantity of the steroid.

The conversion of the valuable 3-alkoxy-13-phenyl-gonenes prepared in accordance with the above illustrated series of reactions to compounds of the classes represented by Formulas A and B, above will now be described.

For the preparation of 13-phenyl compounds of Classes C, D and E, Compound 4 of the above sequence is utilized.

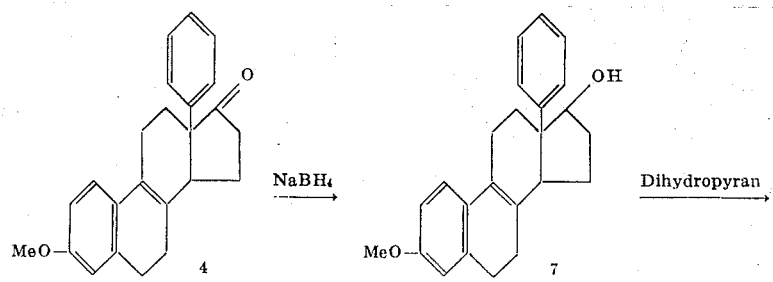

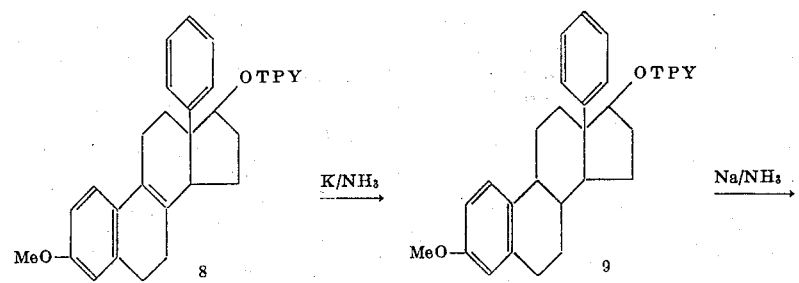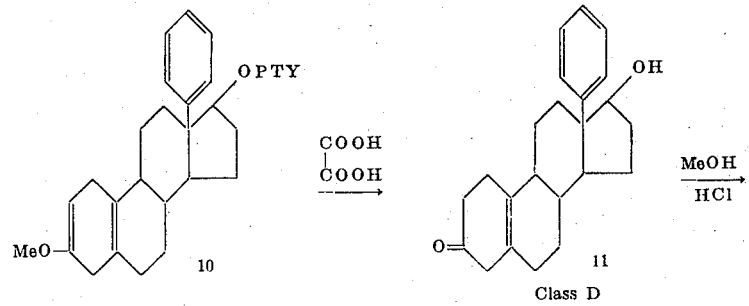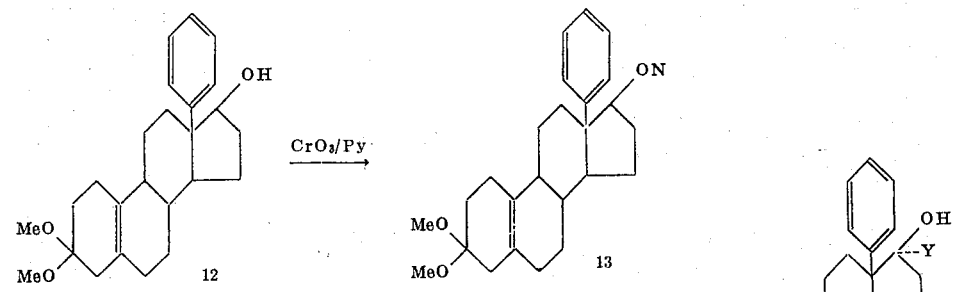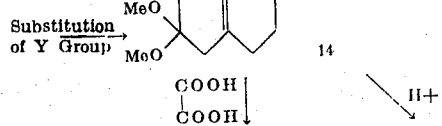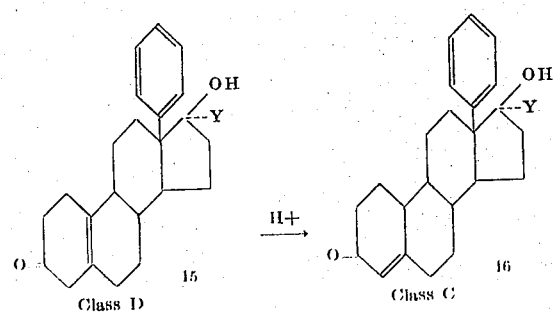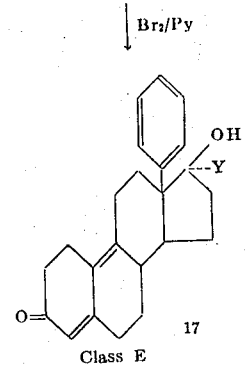

The conversion of Compound 4 to Compound 7 is described above. The 17β-hydroxy group in the steroid molecule is protected by reaction with dihydropyran in the presence of an acidic reagent, such as benzenesulfonyl chloride to form the corresponding tetrahydropyranyl ether. The reaction takes place, for example, on addition of p-toluenesulfonyl chloride to a solution of the steroid in excess dihydropyran. The reaction mixture is stirred at about 20°C. to about 35°C. for from 16 to 64 hours. The product may be recovered by neutralizing the reaction mixture and extracting with a water immiscible solvent such as ether. The product illustrated is 3-methoxy-13-phenyl-gona-1,3,5,8(9)-tetraene-17β-ol tetrahydropyranyl ether.

The product thus obtained is reduced with potassium in liquid ammonia utilizing the procedure for the conversion of Compound 4 to Compound 5 which is described above to produce 3-methoxy-13-phenyl-gona-1,3,5-triene-17β-ol tetrahydropyranyl ether. This compound is converted to 3-methoxy-13-phenyl-gona-2,5-diene-17β-ol 21: tetrahydropyranyl ether by reaction with about ten equivalents of sodium in liquid ammonia. The general conditions of the reaction are the same as with the previous potassium reduction.

Reaction of Compound 10 with oxalic acid affords a therapeutically useful steroid of Class D, namely 13-phenylgona-5(10)-ene-17β-ol-3-one. Reaction is effected in the presence of a catalytic quantity of oxalic acid in a reaction inert solvent such as a lower alkanol, suitably methanol or ethanol at about 20°C. to 35°C. for from about 12 to about 24 hours.

The 3-keto-gona-5(10)ene is converted to a lower alkoxy ketal such as the dimethoxy or diethoxy ketal by reaction with the appropriate alcohol in the presence of a trace of an acid such as malonic acid or a mineral acid, suitably hydrochloric acid at about 20°C. to 30°C. for from about 10 to about 20 hours.

The dimethoxy ketal or 13-phenyl-gona-5-(10)-ene-17β-ol-3-one is then oxidized as described above with, for example, the pyridine-chromium trioxide complex as described above to produce the corresponding 17-one, namely the 3,3-dimethoxy-13-phenyl-gona-5(10)-ene-17-one.

The Y-group is then substituted at the 17-position by the procedures which will be described in more detail below. For convenience, the compounds will hereafter be described as 17α-chloroethynyl compounds, but it should be kept in mind that other Y-groups may be present in place of the chloroethynyl radical.

Treatment of the 3-dimethoxy ketal of 17α-chloroethynyl-13-phenyl-gona-5(10)-ene-17β-ol with oxalic acid under the conditions described above affords 17α-chloroethynyl-13-phenyl-gona-5(10-ene-17β-ol-3-one. Treatment of the same starting compound with a strong acid for example, concentrated hydrochloric acid in a lower alkanol such as methanol at about 20°C. to 35°C. for approximately one hour affords Compound 16, 17α-chloroethynyl-13-phenyl-gona-4-ene-17β-ol-3-one which can also be prepared directly from Compound 15 by the same treatment.

Compound 17, 17α-chloroethynyl-13-phenyl-gona-4,9-diene-17β-ol-3-one is prepared by reaction of compound 15 with approximately one equivalent of bromine in pyridine solution, or with pyridine perbromide hydrobromide.

An alternative procedure by which the 17α-substituted compounds represented by Formula C may be prepared form the corresponding 17α-hydrogen compound, which is in turn prepared from Compound 10 is illustrated below:

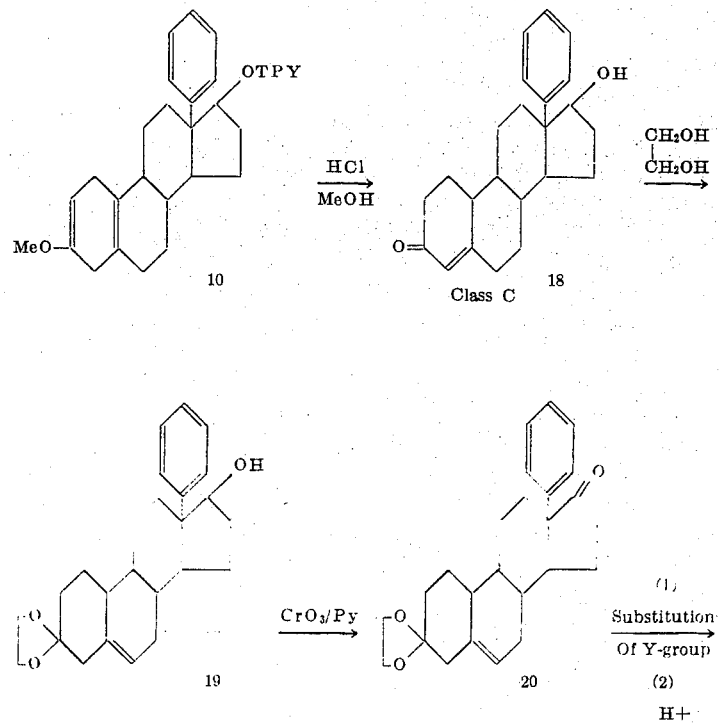

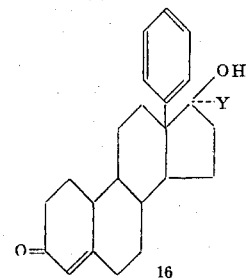

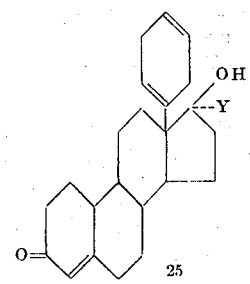

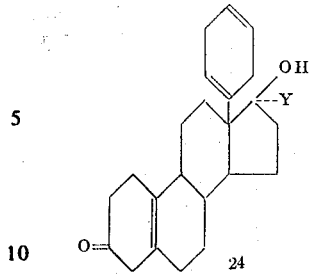

The conversion to Compound 18 is effected in a lower alkanol such as methanol containing a small amount of a mineral acid such as hydrochloric acid at 20°C. to 35°C. for about 6 to 8 hours.

The 3-keto group is then protected by formation of an alkylenedioxy derivative, for example, an ethylenedioxy derivative by reaction with ethyleneglycol in benzene, toluene, ethylene dichloride or other reaction inert organic solvent in the presence of acid catalysts such as p-toluene-sulfonic acid or sulfuric acid, the water by-product being continuously removed. Lower alkylenedioxy derivatives wherein the hydrocarbon group contains not more than seven carbon atoms such as trimethylenedioxy, propylenedioxy and butylenedioxy derivatives are preferred in the practice of this invention.

The Y-group is next substituted as will be explained in detail below. The protecting group is hydrolytically cleaved using for example a mineral acid such as hydrochloric acid in a lower alkanol such as methanol.

In an alternative method of preparing compounds represented by Formulas C, D and E above, a 3-lower alkoxy triene of the class represented by Compound 5 above is first reduced with a large excess of sodium in liquid ammonia. The sequence is shown below.

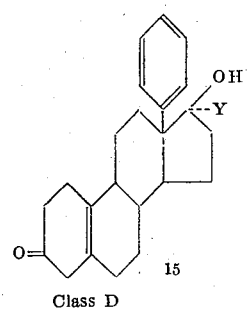

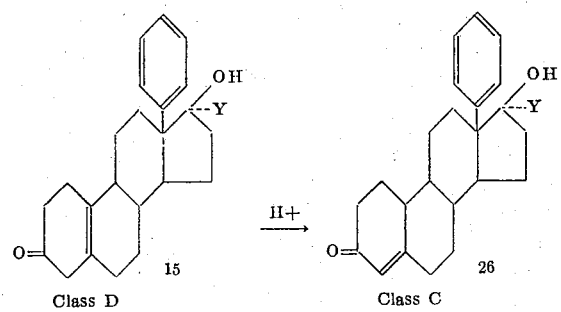

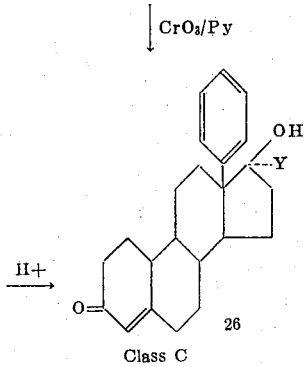

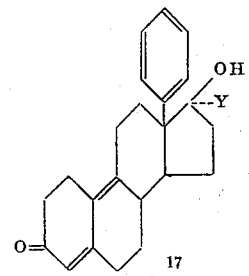

In the first step of the synthesis the reduction with sodium in ammonia is carried out as described above. A large excess of sodium, i.e. 10 to 20 equivalents of sodium per equivalent of steroid, is employed. The compound produced is 3-methoxy-13-cyclohexadienyl-gona-2,5(10)-diene-17β-ol. This compound is then oxidized by reaction with a metal alkoxide in the presence of a suitable ketone. It is most readily carried out in an inert organic solvent such as benzene, toluene, dioxane and the like. The reaction is conveniently effected by dissolving the steroid in a mixture of a ketone and the organic solvent, adding a metal alkoxide thereto and warming the reaction mixture. Suitable ketones which may be used in this reaction include acetone, methyl ethyl ketone, cyclohexanone and the like. For this reaction the combination of cyclohexanone as the ketone, toluene as the inert solvent and aluminum isopropoxide

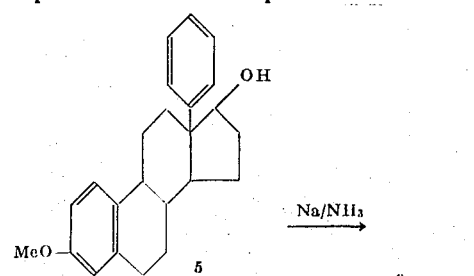

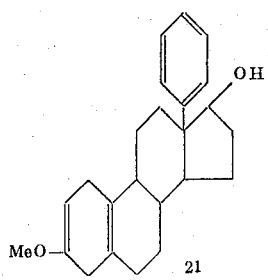

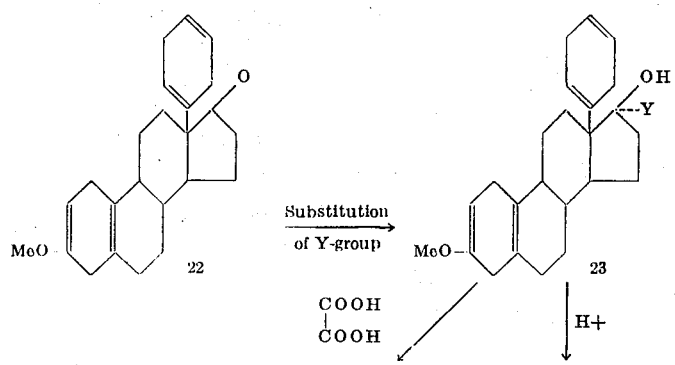

as the metal oxide is preferred. The compound produced is 3-methoxy-13-cyclohexadienyl-gona-2,5(10)-diene-17-one.

Substitution of the Y-group is effected as will be explained below. For convenience the compounds will again be referred to as 17α-chloroethynyl compounds.

Subsequent conversions for the production of Compounds 24 and 25 from Compound 23 and Compounds 26 and 17 from Compound 15 are in accordance with the procedures described above. The aromatization of the 13-cyclohexadienyl ring with pyridine-chromium trioxide is effected under somewhat less rigorous conditions than are usually employed for the oxidation of primary and secondary alcohols with this reagent. Although approximately the same amounts of each reagent are employed, it is preferred to mix them at low temperature, e.g. 0°C. to 10°C. and then to stir while the solution slowly comes to room temperature. Reaction is normally complete in about one-half to about one hour although reaction may be continued for as long as two hours.

Cyclohexyl compounds of the class represented by Formulas C, D and E can be prepared from compounds of the class represented by Compound 5 and above by the series of reactions represented below:

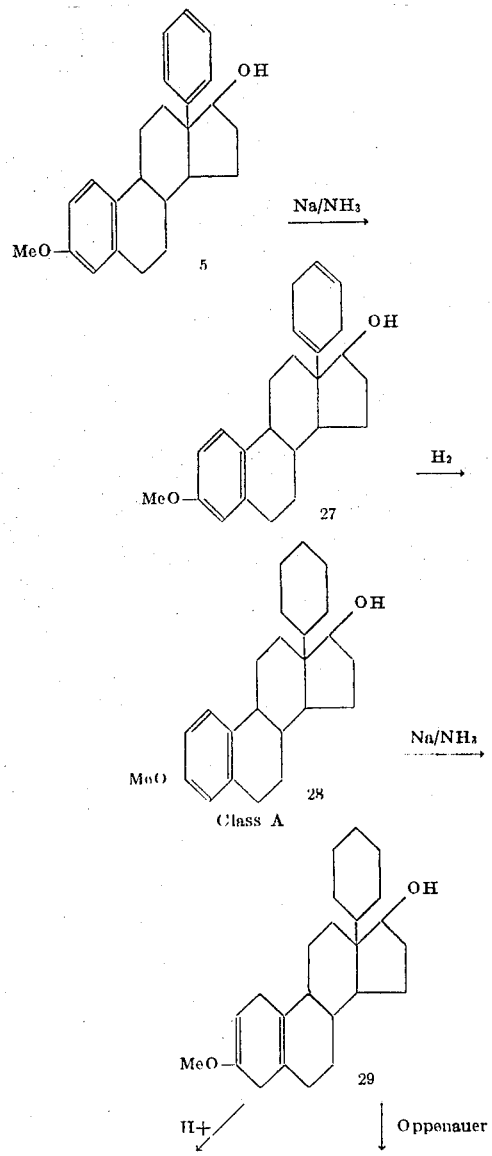

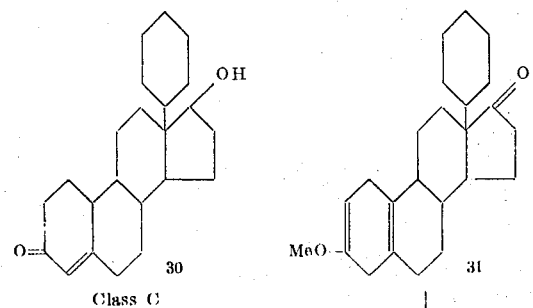

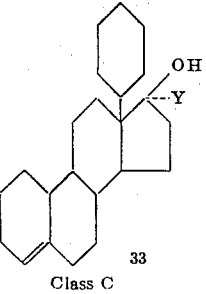

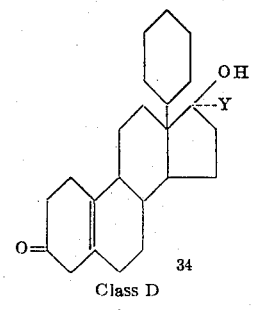

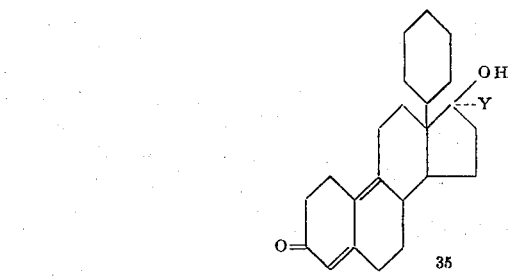

The reaction sequences set forth above illustrate an important part of the process aspect of this invention. With A-ring aromatic compounds having a 13-phenyl substituent and a 17β-hydroxyl group either the 13-phenyl group or the aromatic A-ring may be selectively reduced with sodium in liquid ammonia. With 2 to 5 equivalents of sodium the 13-phenyl group is reduced. This is shown in the conversion of Compound 5 to Compound 27. With a larger excess of sodium, e.g. 10 to 20 equivalents, both rings are reduced. This is illustrated by the conversion of Compound 5 to Compound 21. On the other hand, if the 17β hydroxyl group is blocked, for example, with a tetrahydropyranyl radical, the 13-phenyl group is stable. Even in the presence of a large excess of sodium, only the A-ring is reduced. This is illustrated by the conversion of Compound 9 to Compound 10.

Referring now to the last sequence of reactions illustrated above, the reduction to the cyclohexadienyl compound is effected with sodium in liquid ammonia under the reaction conditions heretofore described, except that only 2 to 5 equivalents of sodium is employed. The reduction to a 13-cyclohexyl compound is carried out by catalytic hydrogenation using a noble metal catalyst, suitably palladium on carbon. The reduction of the A-ring is effected with a large excess of sodium in liquid ammonia. The other conversions illustrated have been previously described and are more fully illustrated in the examples.

Compounds within the scope of formula A having a 13-cyclohexyl substituent are prepared from compounds of the class illustrated by compound 28 by the following series of actions.

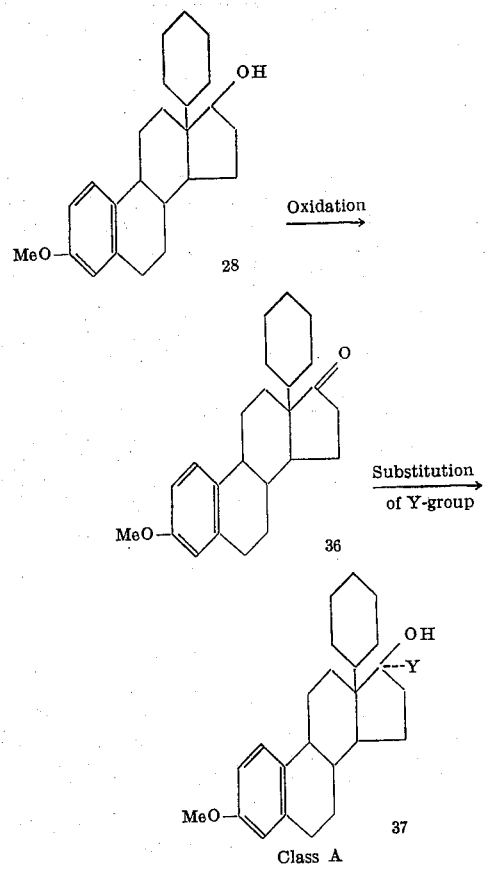

Class A

Oxidation may be effected by any convenient method, for example, with chromium trioxide-pyridine or under Oppenauer conditions. Both of these reactions are discussed above.

The substitution of the various Y-groups within the scope of this invention will now be described.

Haloethynyl groups such as chloroethynyl or bromoethynyl are introduced by reaction of the haloethyne with the corresponding 17-oxo compound. In a preferred embodiment of this procedure, the haloethyne is formed in situ by reaction of a 1,2-dihaloethylene such a 1,2-dichloroethylene (preferably in the cis form) with methyl lithium in an inert organic solvent. For example, 17α-chloroethynyl-3 -methoxy-13-cyclohexadienyl-gona-2,5(10)-diene-17β-ol is prepared by adding a solution of cis-1,2-dichloroethylene in ether to an ether solution of methyl lithium at 0°C., stirring the mixture under nitrogen for one to two hours, adding the steroid and stirring the mixture for several hours longer. An inert atmosphere is not essential, but helps to minimize side reactions.

The trifluorovinyl substituent is introduced by reaction of the steroid with trifluorovinyl magnesium bromide in a reaction inert organic solvent at about 20°C. to 35°C.

The 17α-trifluoropropynyl compounds of this invention are prepared by reaction of the corresponding 17-oxo compound with trifluoropropyne previously treated with ethyl magnesium bromide. For example, the product is prepared by reaction between the steroid and the reaction product of trifluoropropyne and ethyl magnesium bromide in an inert organic solvent.

The 17α-trifluoropropenyl group may be reduced to form the 17α-(3',3',3'-trifluoropropynyl derivative. This reaction may be effected using a noble metal catalyst such as a Lindlar catalyst (lead deactivated palladium on calcium carbonate) at an elevated temperature, and to a trifluoropropyl derivative by hydrogenation with a noble metal catalyst such as platinum dioxide, or 10 percent palladium on carbon.

Alkyl groups such as methyl, ethyl or propyl are introduced at the 17α-position by reaction of the steroid with a Grignard reagent such as methyl magnesium iodide in a reaction inert organic solvent.

The 17α-ethynyl and 17α-vinyl compounds within the scope of the invention are obtained by reaction of the steroid with acetylene to provide the ethynyl compound which is then reduced to the vinyl compound using a Lindlar catalyst. These latter compounds may be reduced with hydrogen in the presence of palladium on carbon to provide another method for the preparation of 17α-ethyl compounds. The 17α-propynyl, propenyl and propyl compounds may be similarly prepared.

The 17α-haloethynyl substituents may be reduced to halovinyl compounds by hydrogenation with a Lindlar catalyst and to haloalkyl substituents by hydrogenation using a noble metal catalyst such as platinum dioxide, or 10 percent palladium on carbon.

The esters of this invention are prepared by reaction of the steroid with an acylating agent, for example, an anhydride or halide in the presence of a basic reagent, preferably a tertiary amine such as pyridine.

The ethers of this invention are prepared, for example, by reaction of the corresponding 17β-hydroxy compound with an alkyl halide and silver oxide in a solvent such as dimethylformamide. The alkyl halides which may be used for this purpose are methyl iodide, ethyl iodide, n-propyl iodide, n-butyl iodide and the like. They may also be prepared by reaction with a sulfide or halide under alkaline conditions. For example, the steroid may be treated with a sulfate such as dimethyl sulfate in an aqueous alkaline medium to produce a methoxy compound. Alternatively, the steroid may be treated in an inert organic solvent such as an aromatic hydrocarbon solvent, more particularly benzene or toluene with a halide such as benzyl chloride in the presence of an alkali metal hydride such as sodium hydride to produce a 17-benzyloxy ether.

A lower alkoxy group at the 3-position of a compound of the class represented by Formula A can be converted corresponding to the 3-hydroxy compound by treatment with pyridine hydrochloride in the melt for about 30 minutes to about 1 hour. The amount of hydrochloride utilized may vary from about 0.5 to about 1.5 times the weight of the steroid employed. The preferred ratio is 1:1. At the end of the reaction period the residue is taken up in water and the insoluble steroids recovered by filtration.

The compounds of this invention represented by Formulas A and B, above are physiologically active and are useful in the treatment of human ailments in the same manner as other compounds having anti-androgenic activity and which are active in the parabiotic assay. These compounds, and particularly those in which the 13-carbocyclic substituent is cyclopentyl, such as 17-hydroxy-13-cyclopentyl-gona-4-ene-3-one, possess anti-progestational action and are thus useful as abortificaients. They are also useful, because of the unusual cyclic structure at the 13-position in conducting studies to determine structural requirements for physiologically active steroids. The compounds when used in therapy may be administered alone or associated with a pharmacologically acceptable carrier, the choice of which will depend upon the properties of the active compound and standard pharmaceutical practice. Generally the compound is administered in dosages of the same order of magnitude as other known compounds having similar activity and dosage units may take the form of tablets, powders, capsules, elixirs or syrups which are particularly useful for oral ingestion. Sterile liquid diluents may be employed for parenteral use.

The following examples illustrate methods of carrying out the present invention, but it is to be understood that these examples are given for purposes of illustration and not of limitation.

EXAMPLE 1

2-(6-methoxy-1,2,3,4-tetrahydranaphthylidene-ethyl)-2-phenyl-cyclopentane-1,3-dione A total of 13 g. of 1-vinyl-6-methoxy-1-tetrol and 13 g. of 2-phenyl-1,3-cyclopentanedione is dissolved in 104 ml. of xylene and 52 ml. of t-butanol. To the mixture there is added 5 ml. of a 40 percent methanolic solution of Triton B and the mixture is refluxed for five hours and cooled. An equivalent volume of ether is added and the mixture filtered. The organic solution is washed with water and 1 N sodium hydroxide. The organic solution is dried over anhydrous magnesium sulfate, filtered, concentrated and recrystallized from ether to obtain the desired product.

In a similar manner starting with 1-vinyl-6-ethoxy-1-tetrol, 1-vinyl-propoxy-1-tetrol and 1-vinyl-6-butoxy-1-tetrol with 2-phenyl-1,3-cyclopentanedione the following compounds are obtained:
2-(6-ethoxy-1,2,3,4-tetrahydronaphthylidene-ethyl)-2-phenylcyclopentane-1,3-dione
2-(6-propoxy-1,2,3,4-tetrahydronaphthylidene-ethyl)-2-phenylcyclopentane-1,3-dione
2-(6-butoxy-1,2,3,4-tetrahydronaphthylidene-ethyl)-2-phenylcyclopentane-1,3-dione

EXAMPLE 2

3-methoxy-13-phenyl-gona-1,3,5,8(9),14-pentaene-17-one

A mixture containing 14.4 g. of the 2-(6-methoxy-1,2,3,4-tetrahydranaphthylidene-ethyl)-2-phenyl-cyclopentane-1,3-dione obtained in Example 1 together with 15.2 g. of p-toluene sulfonic acid in 1500 ml. of glacial acetic acid is stirred for 16 hours at room temperature. The mixture is poured slowly into 6 liters of an ice-water mixture to precipitate the desired product which is recovered by filtration, washed with water and dried in vacuo.

In a similar manner starting with the other compounds prepared in Example 1, the following compounds are obtained:
3-ethoxy-13-phenyl-gona-1,3,5,8(9),14-pentaene-17-one
3-propoxy-13-phenyl-gona-1,3,5,8(9),14-pentaene-17-one
3-butoxy-13-phenyl-gona-1,3,5,8(9),14-pentaene-17-one

EXAMPLE 3

3-methoxy-13-phenyl-gona-1,3,5,8(9)-tetraene-17-one

The 3-methoxy-13-phenyl-gona-1,3,5,8(9),14-pentaene-17-one obtained in Example 2 (7.6 g.) is dissolved in 300 ml. of benzene containing 760 mg. of 10 percent palladium on carbon. The mixture is hydrogenated at room temperature and atmospheric pressure until no more hydrogen is absorbed. The catalyst is removed by filtration and the desired product obtained by evaporation of the solvent.

In a similar manner the other products obtained in Example 2 are used to prepare the following compounds;
3-ethoxy-13-phenyl-gona-1,3,5,8(9)-tetraene-17-one
3-propoxy-13-phenyl-gona-1,3,5,8(9)-tetraene-17-one
3-butoxy-13-phenyl-gona-1,3,5,8(9)-tetraene-17-one

EXAMPLE 4

3-methoxy-13-phenyl-gona-1,3,5-triene-17β-ol

The 3-methoxy-13-phenyl-gona-1,3,5,8(9)-tetraene-17-one obtained in Example 3 (500 mg.) is dissolved in 40 ml. of dry tetrahydrofuran and the solution added to a solution of 350 mg. of potassium in 120 ml. of dry ammonia. Discoloration occurs during addition and another 350 mg. of potassium is added. The solution is now colored blue. It us stirred for 6 hours at the temperature of refluxing ammonia. The excess potassium is removed by the addition of ammonium chloride and the ammonia allowed to evaporate. The residue is taken up in water, extracted three times with equivalent volumes of ether, the combined organic washes are washed with water, dried over anhydrous magnesium sulfate, filtered and concentrated to leave the desired product as a residue.

In a similar manner utilizing the other compounds prepared in Example 3, the following compounds are prepared:
3-ethoxy-13-phenyl-gona-1,3,5-triene-17β-ol
3-propoxy-13-phenyl-gona-1,3,5-triene-17β-ol
3-butoxy-13-phenyl-gona-1,3,5-triene-17β-ol

EXAMPLE 5

3-methoxy-13-phenyl-gona-1,3,5-triene-17-one

The 3-methoxy-13-phenyl-gona-1,3,5-triene-17β-ol obtained in Example 4 (550 mg.) is taken up in 5.5 ml. of pyridine and the mixture added to a solution of 550 mg. of chromium trioxide dissolved in 5.5 ml. of pyridine. The mixture is stirred at room temperature for about 16 hours and poured into water. The aqueous mixture is extracted with ethyl acetate. The organic solution is washed with water, dried over anhydrous magnesium sulfate and the solvent removed to leave the desired product as a residue.

In a similar manner utilizing the other compounds prepared in Example 4 the following compounds are prepared:
   3-ethoxy-13-phenyl-gona-1,3,5-triene-17-one
   3-propoxy-13-phenyl-gona-1,3,5-triene-17-one
   3-butoxy-13-phenyl-gona-1,3,5-triene-17-one

EXAMPLE 6

3-methoxy-13-phenyl-gona-1,3,5,8(9)-tetraene-17β-ol

A total of 7.4 g. of the 3-methoxy-13-phenyl-gona-1,3,5,8(9)-tetraene-17-one obtained in Example 3 is dissolved into 200 ml. of absolute ethanol, 5.78 g. of sodium borohydride is added, and the mixture refluxed for 3 hours. The mixture is poured into an ice cold saturated solution of sodium dihydrogen phosphate, and the mixture diluted by the addition of water. The aqueous mixture is extracted with benzene, the organic layer dried over anhydrous magnesium sulfate, filtered and concentrated to yield the desired product.

In a similar manner utilizing the other compounds prepared in Example 3, the following compounds are prepared:
   3-ethoxy-13-phenyl-gona-1,3,5,8(9)-tetraene-17β-ol
   3-propoxy-13-phenyl-gona-1,3,5,8(9)-tetraene-17β-ol
   3-butoxy-13-phenyl-gona-1,3,5,8(9)-tetraene-17β-ol

EXAMPLE 7

3-methoxy-17β-tetrahydropyranyloxy-13-phenyl-gona-1,3,5,8(9)-tetraene

The 3-methoxy-13-phenyl-gona-1,3,5,8(9)-tetraene-17β-ol prepared in Example 6 is dissolved in 40 ml. of dry distilled dihydropyran, 400 mg. of p-toluene-sulfonic acid is added, and the mixture stirred at room temperature for about 16 hours. This is then poured into a solution of 300 ml. of 10 percent aqueous sodium bicarbonate solution containing 5 ml. of pyridine. The aqueous mixture is extracted with benzene and the organic layer dried over anhydrous magnesium sulfate, filtered, and concentrated to leave the desired product as a residue.

In a similar manner utilizing the other compounds prepared in Example 6 the following compounds are prepared:
   3-ethoxy-17β-tetrahydropyranyloxy-13-phenyl-gona-1,3,5,8(9)-tetraene
   3-propoxy-17β-tetrahydropyranyloxy-13-phenyl-gona-1,3,5,8(9)-tetraene
   3-butoxy-17β-tetrahydropyranyloxy-13-phenyl-gona-1,3,5,8(9)-tetraene

EXAMPLE 8

3-methoxy-17β-tetrahydropyranyloxy-13-phenyl-gona-1,3,5-triene

This compound is prepared by reacting 3-methoxy-17β-tetrahydropyranyloxy-13-phenyl-gona-1,3,5,8(9)-tetraene with potassium in the same manner as that utilized in the preparation of the compound of Example 4. The following compounds are similarly prepared utilizing the other compounds prepared in Example 7:
   3-ethoxy-17β-tetrahydropyranyloxy-13-phenyl-gona-1,3,5-triene
   3-propoxy-17β-tetrahydropyranyloxy-13-phenyl-gona-1,3,5-triene
   3-butoxy-17β-tetrahydropyranyloxy-13-phenyl-gona-1,3,5-triene

EXAMPLE 9

3-methoxy-17β-tetrahydropyranyloxy-13-phenyl-gona-2,5(10)-diene

The 3-methoxy-17β-tetrahydropyranyloxy-13-phenyl-gona-1,3,5-triene from Example 8 (500 mg.) is dissolved in 28 ml. of dry tetrahydrofuran. The solution is added to 45 ml. of ammonia containing 8.5 ml. of t-butanol. To this mixture there is added 137 mg. of metallic sodium and the mixture refluxed for 20 minutes at the reflux temperature of liquid ammonia. The reaction is quenched by the addition of methanol and the product isolated as described in the previous example.

In a similar manner utilizing the other compounds prepared in Example 8 the following compounds are prepared:
   3-ethoxy-17β-tetrahydropyranyloxy-13-phenyl-gona-2,5(10)-triene
   3-propoxy-17β-tetrahydropyranyloxy-13-phenyl-gona-2,5(10)-triene
   3-butoxy-17β-tetrahydropyranyloxy-13-phenyl-gona-2,5(10)-triene

EXAMPLE 10

13-phenyl-gona-5(10)-ene-17β-ol-3-one

The 3-methoxy-17β-tetrahydropyranyloxy-13-phenyl-gona-2,5(10)-diene obtained in Example 9 is taken up in 40 ml. of methanol containing 0.1 g. of oxalic acid and held at 35°C. for 12 hours. The solvent is removed in vacuo and the residue taken up in ether. The ether solution is washed with dilute aqueous sodium bicarbonate and with water. It is dried over anhydrous magnesium sulfate, filtered and the solvent evaporated to leave the desired product as a residue.

This same product is obtained by similarly treating each of the other compounds prepared in Example 9.

EXAMPLE 11

3,3-dimethoxy-13-phenyl-gona-5(10)-ene-17β-ol

The 13-phenyl-gona-5(10)-ene-17β-ol-3-one obtained in Example 10 (1 g.) is dissolved in 15 ml. of methanol and 0.5 g. of malonic acid is added. The mixture is stirred for about 16 hours at room temperature and poured into excess aqueous sodium bicarbonate. The aqueous mixture is extracted with ether and the organic layer dried over anhydrous magnesium sulfate, filtered, and the solvent evaporated to leave the desired product as a residue.

In a similar manner, but replacing the methanol with equivalent quantities of ethanol, propanol or n-butanol, the following compounds are prepared:
   3,3-diethoxy-13-phenyl-gona-5(10)-ene-17β-ol
   3,3-dipropoxy-13-phenyl-gona-5(10)-ene-17β-ol
   3,3-dibutoxy-13-phenyl-gona-5(10)-ene-17β-ol

EXAMPLE 12

3,3-dimethoxy-13-phenyl-gona-5(10)-ene-17-one

This 3,3-dimethoxy-13-phenyl-gona-5(10)-ene-17-one, and the corresponding 3,3-diethoxy, 3,3-dipropoxy and 3,3-dibutoxy compounds, are prepared starting with 3,3-dimethoxy-13-phenyl-gona-5(10)- ene-17β-ol or the other compounds prepared in Example 11, by oxidation with chromium trioxide and pyridine in accordance with the procedure in Example 5.

EXAMPLE 13

3,3-dimethoxy-17β-methyl-13-phenyl-gona-5(10)-ene-17β-ol

A methyl Grignard reagent is prepared by adding with stirring a solution containing 3 ml. of methyl iodide in 10 ml. of ether to 300 mg. of magnesium covered with 10 ml. of ether. After the magnesium has been consumed, an additional 20 ml. of ether is added. To this solution is added 2 g. of 3,3-dimethoxy-13-phenyl-gona-5(10)-ene-17-one (from Example 12) in ether. The reaction mixture is allowed to stand at room temperature for about 16 hours, decomposed with water, and the ether layer is separated, dried over anhydrous magnesium sulfate and concentrated in vacuo. Chromatography of the residual material on basic alumina gives the desired product.

In a similar manner, starting with the other products prepared in Example 12 and, when necessary, replacing the methyl Grignard reagent with ethyl or propyl Grignard, the following compounds are prepared:

3,3-diethoxy-17α-methyl-13-phenyl-gona-5(10)-ene-17β-ol
3,3-dipropoxy-17α-methyl-13-phenyl-gona-5(10)-ene-17β-ol
3,3-dibutoxy-17α-methyl-13-phenyl-gona-5(10)-ene-17β-ol
3,3-dimethoxy-17α-ethyl-13-phenyl-gona-5(10)-ene-17β-ol
3,3-diethoxy-17α-ethyl-13-phenyl-gona-5(10)-ene-17β-ol
3,3-dipropoxy-17α-ethyl-13-phenyl-gona-5(10)-ene-17β-ol
3,3-dibutoxy-17α-ethyl-13-phenyl-gona-5(10)-ene-17β-ol
3,3-dimethoxy-17α-propyl-13-phenyl-gona-5(10)-ene-17β-ol
3,3-diethoxy-17α-propyl-13-phenyl-gona-5(10)-ene-17β-ol
3,3-dipropoxy-17α-propyl-13-phenyl-gona-5(10)-ene-17β-ol
3,3-dibutoxy-17α-propyl-13-phenyl-gona-5(10)-ene-17β-ol

EXAMPLE 14

3,3-dimethoxy-17α-ethynyl-13-phenyl-gona-5(10)-ene-17β-ol

A slow stream of acetylene is passed into a stirred solution of potassium t-amylate prepared from 5g. of potassium in 100 ml. of t-amyl alcohol and 100 ml. of ether maintained at 0°C. After saturation of the solution with acetylene, 5 g. of 3,3-dimethoxy-13-phenyl-gona-5(10)-ene-17-one prepared in Example 12 is added. Acetylene addition is continued for 3 hours at 0°C. and then at room temperature for 18 hours. A 100 ml. aqueous solution of 10 percent ammonium chloride is added, and the t-amyl alcohol removed in vacuo. Dilution with water, extraction with ether, drying and concentrating followed by chromatography gives the desired product.

In a similar manner, utilizing the other compounds prepared in Example 12, the following compounds are prepared:

3,3-diethoxy-17α-ethynyl-13-phenyl-gona-5(10)-ene-17β-ol
3,3-dipropoxy-17α-ethynyl-13-phenyl-gona-5(10)-ene-17β-ol
3,3-dibutoxy-17α-ethynyl-13-phenyl-gona-5(10)-ene-17β-ol

EXAMPLE 15

3,3-dimethoxy-17α-vinyl-13-phenyl-gona-5(10)-ene-17β-ol

A mixture of 0.4 g. of 3,3-dimethoxy-17α-ethynyl-13-phenyl-gona-5(10)-ene-17β-ol prepared in Example 14 and 100 mg. of Lindlar catalyst in 30 ml. of ethyl acetate is hydrogenated at atmospheric pressure and room temperature. The solution is filtered and concentrated after absorption of 1 mole of hydrogen. Chromatography of the concentrate gives the desired product.

Utilizing the appropriate starting compounds from Example 14 the following compounds are prepared:

3,3-diethoxy-17α-vinyl-13-phenyl-gona-5(10)-ene-17β-ol
3,3-dipropoxy-17α-vinyl-13-phenyl-gona-5(10)-ene-17β-ol
3,3-dibutoxy-17α-vinyl-13-phenyl-gona-5(10)-ene-17β-ol

EXAMPLE 16

3,3-dimethoxy-17α-ethyl-13-phenyl-gona-5(10)-ene-17β-ol

A mixture of 0.4 g. of 3,3-dimethoxy-17α-ethynyl-13-phenyl-gona-5(10)-ene-17β-ol prepared in Example 14, and 100 mg. of 5 percent palladium on carbon in 30 ml. of ethyl acetate is hydrogenated at atmospheric pressure. The solution is filtered and concentrated after absorption of 2 moles of hydrogen. Chromatography of the concentrate gives the desired product.

Utilizing the other compounds prepared in Example 14 the following compounds are similarly prepared:

3,3-diethoxy-17α-ethyl-13-phenyl-gona-5(10)-ene-17β-ol
3,3-dipropoxy-17α-ethyl-13-phenyl-gona-5(10)-ene-17β-ol
3,3-dibutoxy-17α-ethyl-13-phenyl-gona-5(10)-ene-17β-ol

EXAMPLE 17

3,3-dimethoxy-17α-chloroethynyl-13-phenyl-gona-5(10)-ene-17β-ol

A solution of 54.2 g. of cis-1,3-dichloroethylene in 50 ml. of anhydrous ether is added over approximately 10 minutes to a stirred ethereal solution (anhydrous) of 1.3 molar lithium methyl in an ice bath under nitrogen. The ice bath is removed and stirring continued at room temperature for 15 minutes. There is then added 7.2 g. of 3,3-dimethoxy-13-phenyl-gona-5(10)-ene-17-one, prepared in Example 12, in 600 ml. of anhydrous ether over a period of 20 minutes, and stirring is continued for an additional hour. To this mixture 500 ml. of ether is added, and the reaction mixture washed 4 times with 200 ml. portions of water. The organic layer is separated, dried over anhydrous magnesium sulfate, filtered and the solvent removed. The residue is chromatographed on basic alumina by charging with petroleum ether and eluting with mixtures of petroleum ether and ether to give the desired product.

Utilizing the appropriate starting compounds prepared as in Example 12, and when necessary replacing the dichloroethylene with dibromoethylene, the following compounds are prepared:

3,3-diethoxy-17α-chloroethynyl-13-phenyl-gona-5(10)-ene-17β-ol
3,3-dipropoxy-17α-chloroethynyl-13-phenyl-gona-5(10)-ene-17β-ol
3,3-dibutoxy-17α-chloroethynyl-13-phenyl-gona-5(10)-ene-17β-ol
3,3-dimethoxy-17α-bromoethynyl-13-phenyl-gona-5(10)-ene-17β-ol
3,3-diethoxy-17α-bromoethynyl-13-phenyl-gona-5(10)-ene-17β-ol
3,3-dipropoxy-17α-bromoethynyl-13-phenyl-gona-5(10)-ene-17β-ol
3,3-dibutoxy-17α-bromoethynyl-13-phenyl-gona-5(10)-ene-17β-ol

EXAMPLE 18

3,3-dimethoxy-17α-trifluorovinyl-13-phenyl-gona-5(10)-ene-17β-ol

A solution of 1 g. of 3,3-dimethoxy-13-phenyl-gona-5(10)-ene-17-one, prepared in Example 12, in 10 ml. of benzene containing an equivalent amount of ether is prepared by adding the steroid to 15 ml. of benzene, distilling off 5 ml. of solvent, cooling and adding the ether. To this mixture there is added 10 ml. of a tetrahydrofuran solution containing 0.1 mole of trifluorovinyl magnesium bromide, and the mixture is stirred for approximately 16 hours at 20°C. It is diluted with water and extracted with ether. The combined extracts are washed with water until the washings are weakly basic, dried over anhydrous sodium sulfate, filtered, and the solvent evaporated. The residue is chromatographed as in the previous example to give the desired product.

Utilizing the appropriate starting compounds from Example 12 the following are prepared:

3,3-diethoxy-17α-trifluorovinyl-13-phenyl-gona-5(10)-ene-17β-ol
3,3-dipropoxy-17α-trifluorovinyl-13-phenyl-gona-5(10)-ene-17β-ol
3,3-dibutoxy-17α-trifluorovinyl-13-phenyl-gona-5(10)-ene-17β-ol

EXAMPLE 19

3,3-dimethoxy-17α-trifluoropropynyl-13-phenyl-gona-5(10)-ene-17β-ol

A 50 ml. 3-neck round bottom flask is fitted with a dry ice condenser, a dropping funnel and a magnetic stirrer. After the addition of 210 mg. of magnesium the entire system is swept and flame dried. There is added 5 ml. of dry ether and 1 ml. of ethyl bromide in 5 ml. of ether, drop-wise with stirring, over a period of 15 minutes. After all the magnesium is reacted, 5 ml. of trifluoropropyne (prepared by the reaction of propiolic acid with sulphur tetrafluoride) is distilled into the reaction mixture and the mixture refluxed under dry ice-acetone for 1 hour. The mixture is then allowed to warm to room temperature, the excess gaseous trifluoropropyne being distilled off. A solution of 500 mg. of 3,3-dimethoxy-13-phenyl-gona-5(10)-ene-17β-one, prepared in Example 12, in 5 ml. of ether and 5 ml. of dry benzene (prepared by azeotropic distillation) is added, and the mixture stirred for 16 hours at room temperature. The reaction mixture is quenched with water and extracted with ether. The organic extracts are washed with water until the washings are weakly basic, dried over sodium sulfate and concentrated in vacuo. The residue is chromatographed over basic alumina by charging with petroleum ether and eluting with mixtures of petroleum ether and ether to give the desired product.

The procedure of this example is utilized with the other products prepared in Example 12 to prepare the following compounds:

3,3-diethoxy-17α-trifluoropropynyl-13-phenyl-gona-5(10)-ene-17β-ol
3,3-dipropoxy-17α-trifluoropropynyl-13-phenyl-gona-5(10)-ene-17β-ol
3,3-dibutoxy-17α-trifluoropropynyl-13-phenyl-gona-5(10)-ene-17β-ol

EXAMPLE 20

3,3-dimethoxy-17α-(3',3',3'-trifluoropropenyl)-13-phenylgona-5(10)-ene-17β-ol

A solution of 100 mg. of 3,3-dimethoxy-17α-trifluoropropynyl-13-phenyl-gona-5(10)-ene-17β-ol (prepared in Example 19) and 100 mg. of Lindlar catalyst in 10 ml. of ethyl acetate is treated with hydrogen at 40 lbs/in$^2$ pressure until 1 molar equivalent of hydrogen is absorbed. The mixture is filtered and concentrated and the desired product is obtained by chromatography.

Utilizing the appropriate starting compounds from Example 19 the following compounds are prepared:

3,3-diethoxy-17α-(3',3',3'-trifluoropropenyl)-13-phenyl-gona-5(10)-ene-17β-ol
3,3-dipropoxy-17α-(3',3',3'-trifluoropropenyl)-13-phenyl-gona-5(10)-ene-17β-ol
3,3-dibutoxy-17α-(3,',3',3'-trifluoropropenyl)-13-phenyl-gona-5(10)-ene-17β-ol

EXAMPLE 21

3,3-Dimethoxy-17α-propynyl-13-phenyl-gona-5(10)-ene-17β-ol    3,3-Dimethoxy-17α-propenyl-13-phenyl-gona-5(10)-ene-17β-ol These compounds, as well as the compounds listed hereinbelow, are prepared in accordance with the procedures of Examples 14 and 15, starting with 3,3-dimethoxy-13-phenylgona-5(10)-ene17-one, of the corresponding 3,3-diethoxy, 3,3-dipropoxy or 3,3-dibutoxy compounds, and using propyne in place of acetylene in the Example 14 procedure thereby introducing the 17α-propynyl in place of the 17α-ethynyl of the Example 14 compounds; hydrogenation of these 17α-propynyl compounds by the Example 15 method yields the corresponding 17α-propenyl derivatives:

3,3-diethoxy-17α-propynyl-13-phenyl-5(10)-ene-17β-ol
3,3-dipropoxy-17α-propynyl-13-phenyl-5(10)-ene-17β-ol
3,3-dibutoxy-17α-propynyl-13-phenyl-5(10)-ene-17β-ol
3,3-diethoxy-17α-propenyl-13-phenyl-5(10)-ene-17β-ol
3,3-dipropoxy-17α-propenyl-13-phenyl-5(10)-ene-17β-ol
3,3-dibutoxy-17α-propenyl-13-phenyl-5(10)-ene-17β-ol

EXAMPLE 22

Preparation of 3-lower alkoxy and 17α-substituted 13-phenyl-gona-1,3,5-triene-17β-ol Utilizing the procedures of Examples 13 through 21 and using as a starting compound 3-methoxy-13-phenyl-gona-1,3,5-triene-17-one prepared in accordance with the procedure of Example 5, the following compounds are prepared:

3-methoxy-17α-methyl-13-phenyl-gona-1,3,5-triene-17β-ol
3-methoxy-17α-ethyl-13-phenyl-gona-1,3,5-triene-17β-ol
3-methoxy-17α-propyl-13-phenyl-gona-1,3,5-triene-17β-ol
3-methoxy-17α-ethynyl-13-phenyl-gona-1,3,5-triene-17β-ol
3-methoxy-17α-vinyl-13-phenyl-gona-1,3,5-triene-17β-ol
3-methoxy-17α-chloroethynyl-13-phenyl-gona-1,3,5-triene-17β-ol
3-methoxy-17α-bromoethynyl-13-phenyl-gona-1,3,5-triene-17β-ol
3-methoxy-17α-trifluorovinyl-13-phenyl-gona-1,3,5-triene-17β-ol
3-methoxy-17α-trifluoropropynyl-13-phenyl-gona-1,3,5-triene-17β-ol
3-methoxy-17α-(3',3',3'-trifluoropropenyl)-13-phenyl-gona-1,3,5-triene-17β-ol
3-methoxy-17α-propynyl-13-phenyl-gona-1,3,5-triene-17β-ol
3-methoxy-17α-propenyl-13-phenyl-gona-1,3,5-triene-17β-ol For convenience, only the 3-methoxy compounds are listed. The 3-ethoxy, propoxy and butoxy compounds are similarly prepared.

EXAMPLE 23

17α-methyl-13-phenyl-gona-5(10)-ene-17β-ol-3-one

This compound is prepared from the 3,3-dimethoxy-17α-methyl-13-phenyl-gona-5(10)-ene-17β-ol product of Example 13 utilizing oxalic acid in accordance with the procedure of Example 10. The following compounds are similarly prepared from the products obtained in accordance with the procedures of Examples 13 through 21:

17α-ethyl-13-phenyl-gona-5(10)-ene-17β-ol-3-one
17α-propyl-13-phenyl-gona-5(10)-ene-17β-ol-3-one
17α-propynyl-13-phenyl-gona-5(10)-ene-17β-ol-3-one
17α-propenyl-13-phenyl-gona-5(10)-ene-17β-ol-3-one
17α-ethynyl-13-phenyl-gona-5(10)-ene-17β-ol-3-one
17α-vinyl-13-phenyl-gona-5(10)-ene-17β-ol-3-one
17α-chloroethynyl-13-phenyl-gona-5(10)-ene-17β-ol-3-one
17α-bromoethynyl-13-phenyl-gona-5(10)-ene-17β-ol-3-one
17α-trifluorovinyl-13-phenyl-gona-5(10)-ene-17β-ol-3-one
17α-trifluoropropynyl-13-phenyl-gona-5(10)-ene-17β-ol-3-one
17α-(3', 3', 3'-trifluoropropenyl)-13-phenyl-gona-5(10)-ene-17β-ol-3-one
17α-propynyl-13-phenyl-gona-5(10)-ene-17β-ol-3-one
17α-propenyl-13-phenyl-gona-5(10)-ene-17β-ol-3-one

EXAMPLE 24

17β-methyl-13-phenyl-gona-4-ene-17β-ol-3-one

The 3,3-dimethoxy-17α-methyl-13-phenyl-gona-5(10)-ene-17β-ol prepared in Example 13 (700 mg.) is dissolved in 200 ml. of methanol containing 4 ml. of concentrated hydrochloric acid. The mixture is then diluted with water and the aqueous mixture extracted with ether. The ether extract is dried over anhydrous magnesium sulfate, filtered, concentrated in vacuo and chromatographed on acid washed alumina to give the desired product.

The following compounds are similarly prepared from the products prepared in Examples 13 through 21:

17α-ethyl-13-phenyl-gona-4-ene-17β-ol-3-one
17α-propyl-13-phenyl-gona-4-ene-17β-ol-3-one
17α-propynyl-13-phenyl-gona-4-ene-17β-ol-3-one
17α-propenyl-13-phenyl-gona-4-ene-17β-ol-3-one
17α-ethynyl-13-phenyl-gona-4-ene-17β-ol-3-one
17α-vinyl-13-phenyl-gona-4-ene-17β-ol-3-one
17α-chloroethynyl-13-phenyl-gona-4-ene-17β-ol-3-one
17α-bromomethynyl-13-phenyl-gona-4-ene-17β-ol-3-one
17α-trifluorovinyl-13-phenyl-gona-4-ene-17β-ol-3-one
17α-trifluoropropynyl-13-phenyl-gona-4-ene-17β-ol-3-one
17α-(3',3',3'-trifluoropropynyl)-13-phenyl-gona-4-ene-17β-ol-3-one
17α-propynyl-13-phenyl-gona-4-ene-17β-ol-3-one
17α-propenyl-13-phenyl-gona-4-ene-17β-ol-3-one

EXAMPLE 25

17α-methyl-13-phenyl-gona-4,9-diene-17β-ol-3-one

To 100 mg. of 17α-methyl-13-phenyl-gona-5(10)-ene-17β-ol-3-one of Example 23 in 5 ml. of pyridine is added one equivalent of bromine. The reaction mixture is stirred for 2 hours at room temperature, poured into ice water and extracted with ether. The ether extract is washed with water, dried over anhydrous sodium sulfate and concentrated in vacuo to yield the desired product. The following compounds are similarly prepared from the starting materials prepared in Example 23:

17α-ethyl-13-phenyl-gona-4,9-diene-17β-ol-3-one
17α-propyl-13-phenyl-gona-4,9-diene-17β-ol-3-one
17α-propynyl-13-phenyl-gona-4,9-diene-17β-ol-3-one
17α-propenyl-13-phenyl-gona-4,9-diene-17β-ol-3-one
17α-ethynyl-13-phenyl-gona-4,9-diene-17β-ol-3-one
17α-vinyl-13-phenyl-gona-4,9-diene-17β-ol-3-one
17α-chloroethynyl-13-phenyl-gona-4,9-diene-17β-ol-3-one
17α-bromoethynyl-13-phenyl-gona-4,9-diene-17β-ol-3-one
17α-trifluorovinyl-13-phenyl-gona-4,9-diene-17β-ol-3-one
17α-trifluoropropynyl-13-phenyl-gona-4,9-diene-17β-ol-3-one
17α-(3',3',3'-trifluoropropynyl)-13-phenyl-gona-4,9-diene-17β-ol-3-one
17α-propynyl-13-phenyl-gona-4,9-diene-17β-ol-3-one 17α-propenyl-13-phenyl-gona-4,9-diene-17β-ol-3-one

EXAMPLE 26

13-phenyl-gona-4-ene-17β-ol-3-one

A total of 700 mg. of 3-methoxy-17β-tetrahydropyranyloxy-13-phenyl-gona-2,5(10)-diene prepared in Example 9 is dissolved in 70 ml. of methanol containing 1.75 ml. of concentrated hydrochloric acid and stirred for approximately 16 hours. The mixture is poured into a dilute solution of aqueous sodium bicarbonate and ice. The aqueous mixture is extracted with ether, dried over anhydrous sodium sulfate, filtered and concentrated. The residue is chromatographed on acid washed alumina to give the desired product.

EXAMPLE 27

3-ethylenedioxy-13-phenyl-gona-5-ene-17β-ol

A total of 2 g. of 13-phenyl-gona-4-ene-17β-ol-3-one prepared in Example 26 is dissolved in 66 ml. of dry benzene, and 34 ml. of ethylene glycol and 0.75 g. of p-toluenesulfonic acid added. The mixture is refluxed for 1 hour and an additional 0.75 g. of toluenesulfonic acid added. The mixture is refluxed for 24 hours while continuously removing water. The mixture is cooled, poured into an excess of dilute sodium bicarbonate and diluted with some water. The solution is extracted with benzene and organic layer is dried and concentrated to yield the desired product.

The propylenedioxy and butylenedioxy analogs of this compound are similarly prepared utilizing propylene glycol and butylene glycol respectively.

EXAMPLE 28

3-ethylenedioxy-13-phenyl-gona-5-ene-17-one

This 3-ethylenedioxy-13-phenyl-gona-5-ene-17-one and the corresponding propylenedioxy and butylenedioxy compounds are prepared by oxidation of 3-ethylenedioxy-13-phenyl-gona-5-ene-17β-ol, and the other products of Example 27, with pyridine-chromium trioxide in accordance with the procedure of Example 5.

EXAMPLE 29

3-ethylenedioxy-17α-methyl-13-phenyl-gona-5-ene-17β-ol

This 3-ethylenedioxy-17α-methyl-13-phenyl-gona-5-ene-17β-ol and the corresponding propylenedioxy and butylenedioxy compounds are prepared from 3-ethylenedioxy-13-phenyl-gona-5-ene-17-one and the other products of Example 28 utilizing the procedures of Example 13. In a similar manner the following compounds are prepared utilizing the procedures of Examples 13 through 21. For convenience only, the ethylenedioxy compounds are listed. The propylene and butylene compounds are similarly prepared.

3-ethylenedioxy-17α-ethyl-13-phenyl-gona-5-ene-17βol 3-ethylenedioxy-17α-propyl-13-phenyl-gona-5-ene 17β-ol 3-ethylenedioxy-17α-ethynyl-13-phenyl-gona-5-ene-17β-ol 3-ethylenedioxy-17α-vinyl-13-phenyl-gona-5-ene-17β-

3-ethylenedioxy-17α-chloroethynyl-13-phenyl-gona-5-ene-17β-ol 3-ethylenedioxy-17α-bromoethynyl-13-phenyl-gona-5-ene-17β-ol 3-ethylenedioxy-17α-trifluorovinyl-13-phenyl-gona-5-ene-17β-ol 3-ethylenedioxy-17α-trifluoropropynyl-13-phenyl-gona-5-ene-17β-ol 3-ethylenedioxy-17α-(3',3',3'-trifluoropropenyl)-13-phenyl-gona-5-ene-17β-ol 3-ethylenedioxy-17α-propynyl-13-phenyl-gona-5-ene-17β-ol 3-ethylenedioxy-17α-propenyl-13-phenyl-gona-5-ene-17β-ol These compounds are hydrolyzed with methanol and hydrochloric acid in accordance with the procedure of Example 24 to prepare the products listed in that example.

EXAMPLE 30

3-methoxy-13-cyclohexadienyl-gona-1,3,5-triene-17β-ol

A solution containing 1 g. of 3-methoxy-13-phenyl-gona-1,3,5-triene-17β-ol in 45 ml. of dry tetrahydrofuran is slowly added to a mixture of 75 ml. of dry liquid ammonia and 16.5 ml. of t-butanol. To this mixture there is added 186 mg. of sodium metal, and the mixture is stirred at the temperature of refluxing ammonia for five minutes. It is then quenched by the addition of 3 ml. of methanol. The ammonia is evaporated and the residue taken up with water. The mixture is extracted three times with equivalent volumes of ether, backwashed with water, dried, filtered and concentrated to yield the desired product.

The following compounds are similarly prepared from the appropriate starting compounds:

3-ethoxy-13-cyclohexadienyl-gona-1,3,5-triene-17β-ol 3-propoxy-13-cyclohexadienyl-gona-1,3,5-treien-17β-ol 3-butoxy-13-cyclohexadienyl-gona-1,3,5-triene-17β-ol

EXAMPLE 31

3-methoxy-13-cyclohexyl-gona-1,3,5-triene-17β-ol

This compound is prepared by catalytic hydrogenation of the 3-methoxy-13-cyclohexadienyl-gona-1,3,5-triene-17β-ol of Example 30 using palladium on carbon in accordance with the procedure of Example 3 except that reaction is continued until 2 moles of hydrogen are absorbed. The following compounds are similarly prepared from the other products of Example 30:

3-ethoxy-13-cyclohexyl-gona-1,3,5-triene-17β-ol 3-propoxy-13-cyclohexyl-gona-1,3,5-triene-17β-ol 3-butoxy-13-cyclohexyl-gona-1,3,5-triene-17β-ol

EXAMPLE 32

3-methoxy-13-cyclohexyl-gona-2,5(10)-diene-17β-ol

This 3-methoxy-13-cyclohexyl-gona-2,5(10)-diene-17β-ol and the corresponding 3-ethoxy, 3-propoxy, and 3-butoxy compounds are prepared from the 3-methoxy-13-cyclohexyl-gona-1,3,5-triene-17β-ol and the other compounds prepared in Example 31 in accordance with the procedure of Example 9.

EXAMPLE 33

13-cyclohexyl-gona-4-ene-17β-ol-3-one

This 13-cyclohexyl-gona-4-ene-17β-ol-3-one is prepared by treatment of the 3-methoxy-13-cyclohexyl-gona-2,5(10)-diene-17β-ol and the other compounds prepared in Example 32 with hydrochloric acid in accordance with the procedure of Example 24.

EXAMPLE 34

3-methoxy-13-cyclohexyl-gona-2,5(10)-diene-17-one

A solution of 750 mg. of 3-methoxy-13-cyclohexyl-gona-2,5(10)-diene-17β-ol (or the corresponding 3-ethoxy, 3-propoxy or 3-butoxy compound) prepared as in Example 32, in 25 ml. of dry toluene is stirred with 0.9 g. of aluminum isopropoxide and 9 ml. of cyclohexanone. It is then heated to reflux and cooled. To the mixture there is added 13 ml. of saturated Rochelle salt solution, and the solvent is evaporated by steam distillation. The residue is extracted with benzene. The organic solution is washed with water, dried over anhydrous sodium sulphate, filtered, and the solvent evaporated to give, as residual product, 3-methoxy-13-cyclohexyl-gona-2,5(10)-diene-17-one (or, where the starting material contains one of the above-noted 3-alkoxy groupings other than 3-methoxy, the corresponding 3-ethoxy, 3-propoxy or 3-butoxy derivative).

EXAMPLE 35

3-methoxy-17α-methyl-13-cyclohexyl-gona-2,5(10)-diene-17β-ol

This compound is prepared from the product of Example 34 utilizing the procedure of Example 13.

The following compounds are prepared in accordance with the procedures of Examples 13 through 34. For convenience, the products are listed as 3-methoxy. It will be understood, however, that 3-ethoxy, 3-propoxy, and 3-butoxy compounds are similarly prepared.

3-methoxy-17α-ethyl-13-cyclohexyl-gona-2,5(10)-diene-17β-ol
3-methoxy-17α-propyl-13-cyclohexyl-gona-2,5(10)-diene-17β-ol
3-methoxy-17α-ethynyl-13-phenyl-gona-2,5(10)-diene-17β-ol
3-methoxy-17α-vinyl-13-phenyl-gona-2,5(10)-diene-17β-ol
3-methoxy-17α-chloroethynyl-13-phenyl-gona-2,5(10)-diene-17β-ol
3-methoxy-17α-bromoethynyl-13-phenyl-gona-2,5(10)-diene-17β-ol
3-methoxy-17α-trifluorovinyl-13-phenyl-gona-2,5(10)-diene-17β-ol
3-methoxy-17α-trifluoropropynyl-13-phenyl-gona-2,5(10)-diene-17β-ol
3-methoxy-17α-(3',3',3'-trifluoropropenyl)-13-phenyl-gona-2,5(10)-diene-17β-ol
3-methoxy-17α-propynyl-13-phenyl-gona-2,5(10)-diene-17β-ol
3-methoxy-17α-propenyl-13-phenyl-gona-2,5(10)-diene-17β-ol

EXAMPLE 36

17α-methyl-13-cyclohexyl-gona-4-ene-17β-ol-3-one

This compound is prepared from the 3-methoxy-17α-methyl-13-cyclohexyl-gona-2,5(10)-diene-17β-ol obtained in Example 35 by treatment with concentrated hydrochloric acid in methanol in accordance with the procedure of Example 24.

Each of the compounds listed in the previous example are similarly converted to the corresponding gona-4-ene-3-one with concentrated hydrochloric acid in methanol to provide the following compounds:

17α-ethyl-13-cyclohexyl-gona-4-ene-17β-ol-3-one
17-propyl-13-cyclohexyl-gona-4-ene-17β-ol-3-one
17α-ethynyl-13-phenyl-gona-4-ene-17β-ol-3-one
17α-vinyl-13-phenyl-gona-4-ene-17β-ol-3-one
17α-chloroethynyl-13-phenyl-gona-4-ene-17β-ol-3-one
17α-bromoethynyl-13-phenyl-gona-4-ene-17β-ol-3-one
17α-trifluorovinyl-13-phenyl-gona-4-ene-17β-ol-3-one
17α-trifluoropropynyl-13-phenyl-gona-4-ene-17β-ol-3-one
17α-(3',3',3'-trifluoropropenyl)-13-phenyl-gona-4-ene-17β-ol-3-one
17α-propynyl-13-phenyl-gona-4-ene-17β-ol-3-one
17α-propenyl-13-phenyl-gona-4-ene-17β-ol-3-one

EXAMPLE 37

17α-methyl-13-cyclohexyl-gona-5(10)-ene-17β-ol-3-one

This compound is prepared by treating the 3-methoxy-17α-methyl-13-cyclohexyl-gona-2,5(10)-diene-17β-ol of Example 35 with oxalic acid in methanol in accordance with the procedure of Example 10. The following compounds are similarly prepared from the other products of Example 35:

17α-ethyl-13-cyclohexyl-gona-5(10)-ene-17β-ol-3-one
17α-propyl-13-cyclohexyl-gona-5(10)-ene-17β-ol-3-one
17α-ethynyl-13-phenyl-gona-5(10)-ene-17β-ol-3-one
17α-vinyl-13-phenyl-gona-5(10)-ene-17β-ol-3-one
17α-chloroethynyl-13-phenyl-gona-5(10)-ene-17β-ol-3-one
17α-bromoethynyl-13-phenyl-gona-5(10)-ene-17β-ol-3-one
17α-trifluorovinyl-13-phenyl-gona-5(10)-ene-17β-ol-3-one
17α-trifluoropropynyl-13-phenyl-gona-5(10)-ene-17β-ol-3-one
17α-(3', 3', 3'-trifluoropropenyl)-13-phenyl-gona-5(10)-ene-17β-ol-3-one
17α-propynyl-13-phenyl-gona-5(10)-ene-17β-ol-3-one
17α-propenyl-13-phenyl-gona-5(10)-ene-17β-ol-3-one

EXAMPLE 38

17α-methyl-13-cyclohexyl-gona-4,9-diene-17β-ol

This compound is prepared by treating the 17α-methyl-13-cyclohexyl-gona-5(10)-ene-3-one of Example 37 with pyridine and bromine in accordance with the procedure of Example 25. The following compounds are similarly prepared from the other products of Example 37:

17α-ethyl-13-cyclohexyl-gona-4,9-diene-17β-ol-3-one

17α-propyl-13-cyclohexyl-gona-4,9-diene-17β-ol-3-one
17α-ethynyl-13-phenyl-gona-4,9-diene-17β-ol-3-one
17α-vinyl-13-phenyl-gona-4,9-diene-17β-ol-3-one
17α-chloroethynyl-13-phenyl-gona-4,9-diene-17β-ol-3-one
17α-bromoethynyl-13-phenyl-gona-4,9-diene-17β-ol-3-one
17α-trifluorovinyl-13-phenyl-gona-4,9-diene-17β-ol-3-one
17α-trifluoropropynyl-13-phenyl-gona-4,9-diene-17β-ol-3-one
17α-(3',3',3'-trifluoropropenyl)-13-phenyl-gona-4,9-diene-17β-ol-3-one
17α-propynyl-13-phenyl-gona-4,9-diene-17β-ol-3-one
17α-propenyl-13-phenyl-gona-4,9-diene-17β-ol-3-one

EXAMPLE 39

3-methoxy-13-cyclohexadienyl-gona-2,5(10)-diene-17β-ol

About one gram of 3-methoxy-13-phenyl-gona-1,3,5-triene-17β-ol (prepared as described in Example 4) is dissolved in 30 ml. of dry tetrahydrofuran, and the solution is added to 60 ml. of dry ammonia. About 1.325 g. of sodium metal is then added followed by about 12 ml of dry t-butanol. The resulting blue solution is stirred at the refluxing temperature of liquid ammonia for 1 hour and quenched by the addition of methanol. The ammonia is allowed to evaporate and the residue taken up with water and extracted with ether. The organic solution is dried over anhydrous sodium sulphate, filtered and the solvent evaporated to yield the desired product.

In accordance with this procedure, and utilizing as starting materials the other products of Example 4, there are obtained the following compounds:
  3-ethoxy-13-cyclohexadienyl-gona-2,5(10)-diene-17β-ol
  3-propoxy-13-cyclohexadienyl-gona-2,5(10)-diene-17β
  3-butoxy-13-cyclohexadienyl-gona-2,5(10)-diene-17β-ol

EXAMPLE 40

3-methoxy-13-cyclohexadienyl-gona-2,5(10)-diene-17-one

This product is prepared by oxidation of the 3-methoxy-13-cyclohexadienyl-gona-2,5(10)-diene-17β-ol of Example 39 with aluminum isopropoxide and cyclohexanone in accordance with the procedure of Example 34.

The following compounds are similarly prepared starting with the 3-ethoxy, 3-propoxy and 3-butoxy products of Example 39:
  3-ethoxy-13-cyclohexadienyl-gona-2,5(10)-diene-17-one
  3-propoxy-13-cyclohexadienyl-gona-2,5(10)-diene-17-one
  3-butoxy-13-cyclohexadienyl-gona-2,5(10)-diene-17-one

EXAMPLE 41

3-methoxy-17α-methyl-13-cyclohexadienyl-gona-2,5(10)-diene-17β-ol

This compound is prepared by treating the 3-methoxy-13-cyclohexadienyl-gona-2,5(10)-diene-17-one of Example 40 in accordance with the procedure of Example 13.

The following compounds are similarly prepared from the other products of Example 40 using the procedures of Examples 13 through 34. For convenience the products are listed as 3-methoxy compounds. It will be understood that 3-ethoxy, propoxy, and butoxy compounds are prepared in similar manner.
  3-methoxy-17α-ethyl-13-cyclohexadienyl-gona-2,5(10)-diene-17β-ol
  3-methoxy-17α-propyl-13-cyclohexadienyl-gona-2,5(10)-diene-17β-ol
  3-methoxy-17α-ethynyl-13-cyclohexadienyl-gona-2,5(10)-diene-17β-ol
  3-methoxy-17α-vinyl-13-cyclohexadienyl-gona-2,5(10)-diene-17β-ol
  3-methoxy-17α-chloroethynyl-13-cyclohexadienyl-gona-2,5(10)-diene-17β-ol
  3-methoxy-17α-bromoethynyl-13-cyclohexadienyl-gona-2,5(10)-diene-17β-ol
  3-methoxy-17α-trifluorovinyl-13-cyclohexadienyl-gona-2,5(10)-diene-17β-ol
  3-methoxy-17α-trifluoropropynyl-13-cyclohexadienylgona-2,5(10)-diene-17β-ol
  3-methoxy-17α-(3',3',3'-trifluoropropenyl)-13-cyclohexadienyl-gona-2,5(10)-diene-17β-ol
  3-methoxy-17α-propynyl-13-cyclohexadienyl-gona-2,5(10)-diene-17β-ol
  3-methoxy-17α-propenyl-13-cyclohexadienyl-gona-2,5(10)-diene-17β-ol

EXAMPLE 42

17α-methyl-13-cyclohexadienyl-gona-5(10)-ene-17β-ol-3-one

This product is prepared by treatment of the 3-methoxy-17α-methyl-13-cyclohexadienyl-gona-2,5(10)-diene-17β-ol of Example 41 with oxalic acid in methanol in accordance with the procedure of Example 10.

The following compounds are similarly prepared from the other products of Example 41:
  17α-ethyl-13-cyclohexadienyl-gona-5(10)-ene-17β-ol-3-one
  17α-propyl-13-cyclohexadienyl-gona-5(10)-ene-17β-ol-3-one
  17α-ethynyl-13-cyclohexadienyl-gona-5(10)-ene-17β-ol-3-one
  17α-vinyl-13-cyclohexadienyl-gona-5(10)-ene-17β-ol-3-one
  17α-chloroethynyl-13-cyclohexadienyl-gona-5(10)-ene-17β-ol-3-one
  17α-bromoethynyl-13-cyclohexadienyl-gona-5(10)-ene-17β-ol-3-one
  17α-trifluorovinyl-13-cyclohexadienyl-gona-5(10)-ene-3-one
  17α-trifluoropropynyl-13-cyclohexadienyl-gona-5(10)-ene-17β-ol-3-one
  17α-(3', 3', 3'-trifluoropropenyl)-13-cyclohexa-dienyl-gona-5(10)-ene-17β-ol-3-one
  17α-propynyl-13-cyclohexadienyl-gona-5(10)-ene-17β-ol-3-one
  17α-propenyl-13-cyclohexadienyl-gona-5(10)-ene-17β-ol-3-one

EXAMPLE 43

17α-Methyl-13-phenyl-gona-5(10)-ene-17β-ol-3-one

The 17α-methyl-13-cyclohexadienyl-gona-5(10)-ene-17β-ol-3-one prepared as described in Example 42 (14 g.) is dissolved in 12 ml. of pyridine and added to a cold solution of one gram of chromium trioxide in 20 ml. of pyridine. The mixture is stirred for two hours at room temperature, diluted with water and the aqueous mixture extracted with ethyl acetate. The organic solution is washed with water, dried and the solvent evaporated to leave the desired product as a residue.

EXAMPLE 44

17α-methyl-13-cyclohexadienyl-gona-4-ene-17β-ol-3-one

This product is prepared by treatment of the 3-methoxy-17α-methyl-13-cyclohexadienyl-gona-2,5(10)-diene-17β-ol of Example 41 with concentrated hydrochloric acid in methanol in accordance with the procedure of Example 24.

The following compounds are similarly prepared utilizing as starting materials the other products obtained in Example 41:

17α-ethyl-13-cyclohexadienyl-gona-4-ene-17β-ol-3-one
17α-propyl-13-cyclohexadienyl-gona-4-ene-17β-ol-3-one
17α-ethynyl-13-cyclohexadienyl-gona-4-ene-17β-ol-3-one
17α-vinyl-13-cyclohexadienyl-gona-4-ene-17β-ol-3-one
17α-chloroethynyl-13-cyclohexadienyl-gona-4-ene-17β-ol-3-one
17α-bromoethynyl-13-cyclohexadienyl-gona-4-ene-17β-ol-3-one
17α-trifluorovinyl-13-cyclohexadienyl-gona-4-ene-17β-ol-3-one
17α-trifluoropropynyl-13-cyclohexadineyl-gona-4-ene-17β-ol-3-one
17α-(3',3',3'-trifluoropropenyl)-13-cyclohexadienylgona-4-ene-17β-ol-3-one
17α-propynyl-13-cyclohexadienyl-gona-4-ene-17β-ol-3-one
17α-propenyl-13-cyclohexadienyl-gona-4-ene-17β-ol-3-one

EXAMPLE 45

17α-methyl-13-phenyl-gona-4-ene-17β-ol-3-one

This product is prepared by treating the 17α-methyl-13-cyclohexadienyl-gona-4-ene-17β-ol-3-one of Example 44 with chromium trioxide-pyridine utilizing the procedure of Example 43.

EXAMPLE 46

3-methoxy-13-cyclohexyl-gona-1,3,5-triene-17-one

This compound and the corresponding 3-ethoxy, 3-propoxy and 3-butoxy compounds are prepared by oxidation of the 3-(methoxy, ethoxy, propoxy or butoxy)-13-cyclohexylgona-1,3,5-triene-17β-ol compounds prepared in Example 31 using the procedure of Example 5.

EXAMPLE 47

3-methoxy-17α-methyl-13-cyclohexyl-gona-1,3,5-triene-17β-ol

This compound and the corresponding 3-ethoxy, 3-propoxy, and 3-butoxy compounds are prepared by treating the 3-(methoxy, ethoxy, propoxy or butoxy)-13-cyclohexyl-gona-1,3,5-triene-17-one compounds of Example 46 in accordance with the procedure of Example 13.

The following compounds are also prepared from the products of Example 46 using the procedures of Examples 13 through 21:

3-methoxy-17α-ethyl-13-cyclohexyl-gona-1,3,5-triene-17β-ol
3-methoxy-17α-propyl-13-cyclohexyl-gona-1,3,5-triene-17β-ol
3-methoxy-17α-ethynyl-13-cyclohexyl-gona-1,3,5-triene-17β-ol
3-methoxy-17α-vinyl-13-cyclohexyl-gona-1,3,5-triene-17β-ol
3-methoxy-17α-chloroethynyl-13-cyclohexyl-gona-1,3,5-triene-17β-ol
3-methoxy-17α-bromoethynyl-13-cyclohexyl-gona-1,3,5-triene-17β-ol
3-methoxy-17α-trifluoropropynyl-13-cyclohexyl-gona-1,3,5-triene-17β-ol
3-methoxy-17α-(3', 3', 3'-trifluoropropenyl)-13-cyclohexyl-gona-1,3,5-triene-17β-ol
3-methoxy-17α-propenyl-13-cyclohexyl-gona-1,3,5-triene-17β-ol
3-methoxy-17α-propenyl-13-cyclohexyl-gona-1,3,5-triene-17β-ol For convenience, only the 3-methoxy compounds are listed. It will be understood that the corresponding 3-ethoxy, propoxy, and butoxy compounds are similarly prepared.

EXAMPLE 48

A mixture of 500 mg. of 17α-chloroethynyl-13-cyclohexyl-gona-4,9-diene-17β-ol-3-one, 10 ml. of dimethylformamide, 20 ml. of ethyl iodide and 1.5 g. of silver oxide is stirred at room temperature for 4 days, an additional 0.5 g. of silver oxide being added at the end of each day. At the end of this period, 100 ml. of chloroform is added, the mixture stirred for one hour and filtered. The filtrate is evaporated to dryness, and the residual oil chromatographed over acid-washed alumina and eluted with mixtures of ether and petroleum ether to give 17β-ethoxy-13-cyclohexyl-17α-chloroethynyl-gona-4,9-diene-3-one.

In accordance with this procedure, and utilizing as starting materials each of the 17β-hydroxy compounds obtained in Examples 4, 22, 24, 31, 33, 36, 37, 38 and 47, together with appropriate alkyl, cycloalkyl or aralkyl iodide, there are obtained 17β-methyl, 17β-ethyl, 17β-propyl, 17β-cyclopentyl, 17β-benzyl and 17β-cyclohexyl ethers of each of said 17β-hydroxy compounds.

EXAMPLE 49

Preparation of 17β-Esters

A total of 100 mg. of 17α-chloroethynyl-13-phenyl-gona-4,9-diene-17β-ol-3-one, prepared in accordance with Example 38, is heated with 1 ml. of acetic anhydride and 1.2 ml. of pyridine on the steam bath for about 16 hours. The mixture is then poured on ice and extracted with chloroform. The extract is washed with water and concentrated. The concentrate is chromatographed over acid washed alumina and eluted with mixtures of petroleum ether and ether to give 17β-acetoxy-17α-chloroethynyl-13-phenyl-gona-4,9-diene-3-one.

These 17β-esters are also prepared using acid halides. The following is an example of this procedure:

A total of 100 mg. of 17α-chloroethynyl-13-phenyl-gona-4,9-diene-17β-ol-3-one is heated with 1 ml. of caprylyl chloride and 1.2 ml. of pyridine for about 16 hours. Utilizing the same isolation procedure as that employed when an anhydride is used as the acylating agent, there is obtained 17β-caprylyloxy-13-phenyl-gona-4,9-diene-17β-ol-3-one.

In accordance with these procedures and utilizing as starting materials the 17β-hydroxy compounds obtained in Examples 4, 22, 24, 31, 33, 36, 37, 38 and 47, together with the appropriate alkanoyl or benzoyl anhydride or halide, there are obtained 17-acetates, 17-propionates, 17-butyrates, and 17-benzoates of each of said 17β-hydroxy compounds.

EXAMPLE 50

13-cyclohexyl-gona-1,3,5-triene-3,17β-diol

A mixture of 1 g. of 3-methoxy-13-cyclohexyl-gona-1,3,5-triene-17β-ol (prepared in accordance with Example 31) and 1 g. of pyridine hydrochloride is melted together and held in the molten state for one hour. The reaction melt is cooled to solidify and taken up in water. The insoluble product is recovered by filtration to give 13-cyclohexylgona-1,3,5-triene13,17β-diol.

In accordance with this procedure and utilizing as starting materials the compounds prepared as described in Example 47, there are obtained the following:

17α-methyl-13-cyclohexyl-gona-1,3,5-triene-3,17β-diol
17α-ethyl-13-cyclohexyl-gona-1,3,5-triene-3,17β-diol
17α-propyl-13-cyclohexyl-gona-1,3,5-triene-3,17β-diol
17α-ethynyl-13-cyclohexyl-gona-1,3,5-triene-3,17β-diol
17α-vinyl-13-cyclohexyl-gona-1,3,5-triene-3,17β-diol
17α-chloroethynyl-13-cyclohexyl-gona-1,3,5-triene-3,17β-diol
17α-bromoethynyl-13-cyclohexyl-gona-1,3,5-triene-3,17β-diol
17α-trifluorovinyl-13-cyclohexyl-gona-1,3,5-triene-3,17β-diol
17α-trifluoropropynyl-13-cyclohexyl-gona-1,3,5-triene-3,17β-diol
17α-(3',3',3'-trifluoropropenyl)-13-cyclohexyl-gona-1,3,5-triene-3,17β-diol
17α-propynyl-13-cycloxexyl-gona-1,3,5-triene-3,17β-diol
17α-propenyl-13-cyclohexyl-gona-1,3,5-triene-3,17β-diol

EXAMPLE 51

A solution of 250 g. of 1-vinyl-1-hydroxy-6-methoxy-1,2,3,4-tetrahydronaphthelene and 71 g. of thiourea in 850 ml. of glacial acetic acid is stirred at a temperature of 15°–18°C. until all of the thiourea is dissolved. The temperature is allowed to increase to about 25°C., and the solution is stirred at that temperature for a period of about four hours. The reaction mixture is poured into about 6.5 liters of ether, and the precipitated material is recovered and dried to give about 220 g. of 6-methoxy-1,2,3,4-tetrahydronaphthylidene ethyl isothiouronium acetate.

EXAMPLE 52

A solution of 141 g. of 6-methoxy-1,2,3,4-tetrahydronaphthalene ethyl isothiouronium acetate and 75.8 g. of 2-cyclopentyl-cyclopentane-1,3-dione in 3 liters of tertiary butanol is heated under reflux under nitrogen with stirring for a period of about 3 hours; during the last hour about 1 liter of tertiary butanol is distilled from the reaction mixture. The reaction mixture is cooled and poured into 5 liters of ether, and the organic layer is extracted with 3 separate portions of water, then with 4 separate portions of dilute aqueous sodium bicarbonate solution, and finally with 3 separate portions of water. The ethereal solution is dried over magnesium sulfate, filtered, and the ether evaporated under reduced pressure to give a slurry in residual tertiary butanol. This slurry is filtered and the crystalline material thus obtained is washed with petroleum ether and dried to give about 63 g. of 3-methoxy-13-cyclopentyl-8.14-secogona-1,3,5(10,9(11-tetraen-14,17-dione.

EXAMPLE 53

A solution of about 63 g. of 3-methoxy-13-cyclopentyl-8,14-secogona-1,3,5(10), 9(11)-tetraen-14,17-dione in 450 ml. of 95 percent ethanol is heated to a temperature of about 50°C., and then about 30 ml. of concentrated aqueous hydrochloric acid is added dropwise over a period of about 2 minutes. The resulting mixture is allowed to stand for about 30 minutes at a temperature of about 50°C. The reaction mixture is cooled to about 10°C., and allowed to stand for a period of about 15 hours. The crystalline material which separates is recovered by filtration and dried to give about 58.5 g. of 3-methoxy-13-cyclopentyl-gona-1,3,5(10)8,14-pentaene-17-one.

EXAMPLE 54

A solution of about 57 g. of 3-methoxy-13-cyclopentyl-gona-1,3,5(10)8,14-pentaene-17-one in 300 ml. of tetrahydrofuran and 500 ml. ethanol is heated to a temperature of about 50°C., and to the solution is slowly added about 38 g. of sodium borohydride. The resulting mixture is stirred under nitrogen for a period of about one-half hour. An additional 5 gms. of sodium borohydride is added, and the reaction mixture is stirred for an additional one hour period; the color of the reaction mixture changes from yellow to yellowish purple and then to red-orange. The reaction mixture is poured into 3 liters of ice-cold ammonium chloride solution, which is maintained at approximately 0°C. during the addition. The material which crystallizes is recovered by filtration, dissolved in tetrahydrofuran-ether mixture and the organic solution is washed with water, dried, and evaporated to a small volume. The residual material is triturated with 150 ml. of methanol, and the insoluble crystalline material is recovered by filtration, washed with three 15 ml.-portions of methanol, and dried to give about 48.5 g. of 3-methoxy-17-hydroxy-13-cyclopentyl-gona-1,3,5(10),8,14-pentaene.

EXAMPLE 55

About 4 g. (0.0119 moles) of 3-methoxy-17-hydroxy-13-cyclopentyl-gona-1,3,5(10)-8,14-pentaene is dissolved in 200 ml. of benzene, and the solution is shaken in contact with hydrogen at a pressure of approximately 40 lbs. per square inch in the presence of 2 g. of palladium/calcium carbonate catalyst (containing 25 percent palladium) for a period of about 5 hours. The hydrogenation mixture is filtered, and the filtered benzene solution is evaporated to dryness under reduced pressure. The residual material is crystallized from a 1:2 ether:petroleum ether mixture and dried to give about 3.0 g. of 3-methoxy-17-hydroxy-13-cyclopentylgona-1,3,5(10), 8-tetraene.

EXAMPLE 56

About 6 g. of 3-methoxy-17-hydroxy-13-cyclopentylgona-1,3,5(10),8-tetraene is dissolved in about 30 ml. of pyridine, and 15 ml. of acetic anhydride is added to the solution. The mixture is allowed to stand at room temperature under a nitrogen atmosphere for a period of about 16 hours. The acetylation mixture is poured into dilute aqueous sodium bicarbonate solution, and the crystalline material which separates is recovered by filtration, washed with water, then with 0.2N aqueous hydrochloric acid solution, again with water, and finally triturated with three 20 ml.-portions of petroleum ether. The crystalline material is then recovered by filtration and dried to give about 5.5 g. of 3-methoxy-17-acetoxy-13-cyclopentyl-gona-1,3,5(10),8-tetraene.

EXAMPLE 57

About 15 g. of 3-methoxy-17-acetoxy-13-cyclopentylgona-1,3,5(10)8-tetraene is dissolved in 90 ml. of tetrahydrofuran, and the solution is added to a mixture of 500 ml. of liquid ammonia and 150 ml. aniline. About 6 g. of metallic lithium is then added, and the resulting mixture is stirred for a period of about 4 hours; an additional 2 g. of metallic lithium is added, and the mixture is stirred for a further 2 hour period. The reaction mixture is quenched by the addition of excess ammonium chloride, and the liquid ammonia is allowed to evaporate.

About 500 ml. of water is then added, and the aqueous mixture is extracted with three 200 ml.-portions of ether. The ethereal extract is washed with dilute aqueous hydrochloric acid solution, then with water, dried over anhydrous magnesium sulfate, filtered, and the dry ether solution evaporated substantially to dryness to give about 15 g. of 3-methoxy-17-acetoxy-13-cyclopentyl-gona-1,3,5(10)-triene.

EXAMPLE 58

About 0.5 g. of 3-methoxy-17-acetoxy-13-cyclopentyl-gona-1,3,5(10)-triene is dissolved in about 40 ml. of absolute ethanol, 10 ml. of a 10 percent aqueous sodium hydroxide solution is added, and the resulting mixture is heated under reflux for a period of about 1.5 hours. The reaction mixture is poured into about 100 ml. of water, and the aqueous mixture is extracted with two 100 ml.-portions of ether. The ether extracts are combined, washed with two 50 ml.-portions of water and dried. The ether is then evaporated under reduced pressure to yield 480 mg. of crude material which is crystallized from 3 ml. of methanol to give about 350 mg. of substantially pure 3-methoxy-17-hydroxy-13-cyclopentyl-gona-1,3,5(10)-triene; m.p. 128–131°C.

EXAMPLE 59

About 250 mg. of 3-methoxy-17-hydroxy-13-cyclopentyl-gona-1,3,5(10)-triene is dissolved in 3 ml. of pyridine, and the solution is added to a cold solution containing 250 mg. of chromium trioxide in 4 ml. of pyridine. The resulting mixture is stirred under a nitrogen atmosphere for a period of about 16 hours. About 20 ml. of ethyl acetate is added to the oxidized reaction mixture, and the inorganic material which precipitates is separated by filtration, and washed with three 5 ml.-portions of ethyl acetate. The combined ethyl acetate solution is washed with two 10 ml.-portions of water, then with 10 ml. of dilute aqueous hydrochloric acid solution, and again with 10 ml. of water. The washed ethyl acetate solution is then dried over ammonium sulfate, and evaporated under reduced pressure substantially to dryness to give 240 mg. of crude material which is purified by chromatography, using a silica gel column and benzene for both the developing and eluting solvents, to give about 200 mg. of substantially pure 3-methoxy-13-cyclopentyl-gona-1,3,5(10)-triene-17-one; m.p. 146°–148°C.

EXAMPLE 60

A solution containing about 250 mg. of 3-methoxy-17-acetoxy-13-cyclopentyl-gona-1,3,5(10)-triene (which can be prepared as described in Example 57 hereinabove), 4 ml. of dry tetrahydrofuran and 4 ml. of tertiary butanol, is added to 30 ml. of anhydrous ammonia. About 160 mg. of metallic lithium is then added, followed by 10 drops of ethanol, and the resulting mixture is stirred at the temperature of refluxing liquid ammonia for a period of about 3 hours; 10 mg. of metallic lithium is then added, and the mixture is stirred for an additional one-half hour period. About 2 ml. of ethanol is added to the reaction mixture to quench unreacted lithium, and the liquid ammonia is allowed to evaporate. The residual material is taken up in water, and the aqueous mixture extracted three times with an equal volume of ether. The combined ethereal extracts are washed with water, dried over anhydrous magnesium sulfate, filtered, and evaporated under reduced pressure to give about 200 mg. of 3-methoxy-17-hydroxy-13-cyclopentyl-gona-2,5(10)-diene.

EXAMPLE 61

About 200 mg. of 3-methoxy-17-hydroxy-13-cyclopentyl-gona-2,5(10)-diene is dissolved in about 20 ml. of oxygen-free methanol, about 1 ml. of concentrated aqueous hydrochloric acid solution is added, and the resulting mixture is stirred at room temperature under a nitrogen atmosphere for a period of 16 hours.

The reaction mixture is poured into about 50 cc. of water, and the crystalline material which separates is recovered by filtration, and dried to give about 180 mg. of 17-hydroxy-13-cyclopentylgona-4-ene-3-one.

Various changes and modifications may be made in carrying out the present invention without departing from the spirit and scope thereof. Insofar as these changes and modifications are within the purview of the annexed claims, they are to be considered as part of the present invention.

What is claimed is:

1. The unsaturated 3,17-bis-oxygenated-gonane having the structure

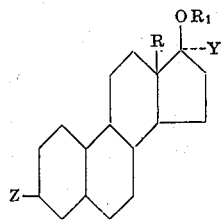

wherein Z is keto, hydroxy or lower alkoxy; R is phenyl, cyclopentyl, cyclohexyl or cyclohexadienyl; $R_1$ is lower alkyl, lower aralkyl, lower cycloalkyl or lower hydrocarbon carboxylic acyl; Y is hydrogen, or a hydrocarbon or halogenated hydrocarbon side chain containing up to three carbon atoms; and wherein the unsaturation is $\Delta^4$, $\Delta^{4,9}$ or $\Delta^{5(10)}$ when Z is keto, and wherein the unsaturation is $\Delta^{2,5(10)}$ or $\Delta^{1,3,5}$ when Z is hydroxy or lower alkoxy.

2. The 3,17-bis-oxygenated-gonane, as defined in claim 1, having the chemical name 3-methoxy-13-phenylgona-1,3,5-triene-17β-ol.

3. The 3,17-bis-oxygenated-gonane, as defined in claim 1, having the chemical name 13-phenyl-gona-4-ene-17β-ol-3-one.

4. The 3,17-bis-oxygenated-gonane, as defined in claim 1, having the chemical name 17β-acetoxy-13-phenylgona-4-ene-3-one.

5. The 3,17-bis-oxygenated-gonane, as defined in claim 1, having the chemical name 17α-chloroethynyl-13-phenyl-gona-4-ene-17β-ol-3-one.

6. The 3,17-bis-oxygenated-gonane, as defined in claim 1, having the chemical name 17β-acetoxy-17α-chloroethynyl-13-phenyl-gona-4-ene-3-one.

7. The 3,17-bis-oxygenated-gonane, as defined in claim 1, having the chemical name 13-cyclohexyl-gona-4-ene-17β-ol-3-one.

8. The 3,17-bis-oxygenated-gonane, as defined in claim 1, having the chemical name 17β-acetoxy-13-cyclohexyl-gona-4-ene-3-one.

9. The 3,17-bis-oxygenated-gonane, as defined in claim 1, having the chemical name 13-phenyl-gona-5(10)-ene-17β-ol-3-one.

10. The 3,17-bis-oxygenated-gonane, as defined in claim 1, having the chemical name 17β-acetoxy-13-phenylgona-5(10)-ene-17β-ol-3-one.

11. The 3,17-bis-oxygenated-gonane, as defined in claim 1, having the chemical name 17α-chloroethynyl-13-phenyl-gona-5(10)-ene-17β-ol-3-one.

12. The 3,17-bis-oxygenated-gonane, as defined in claim 1, having the chemical name 17β-acetoxy-17α-chloroethynyl-13-phenyl-gona-5(10)-ene-3-one.

13. The 3,17-bis-oxygenated-gonane, as defined in claim 1, having the chemical name 13-cyclohexyl-gona-5(10)-ene-17β-ol-3-one.

14. The 3,17-bis-oxygenated-gonane, as defined in claim 1, having the chemical name 17β-acetoxy-13-cyclohexylgona-5(10)-ene-3-one.

15. The 3,17-bis-oxygenated-gonane, as defined in claim 1, having the chemical name 13-phenyl-gona-4,9-dien-17β-ol-3-one.

16. The 3,17-bis-oxygenated-gonane, as defined in claim 1, having the chemical name 17β-acetoxy-13-phenylgona-4,9-dien-3-one.

17. The 3,17-bis-oxygenated-gonane, as defined in claim 1, having the chemical name 17α-chloroethynyl-13-phenyl-gona-4,9-diene-17β-ol-3-one.

18. The 3,17-bis-oxygenated gonane, as defined in claim 1, having the chemical name 17β-acetoxy-17α-chloroethynyl-13-phenyl-gona-4,9-diene-3-one.

19. The 3,17-bis-oxygenated-gonane, as defined in claim 1, having the chemical name 13-cyclopentyl-gona-4-ene-17β-ol-3-one.

20. The 3,17-bis-oxygenated-gonane, as defined in claim 1, having the chemical name 17β-acyloxy-13-cyclopentyl-gona-4-ene-3-one.

21. The 3,17-bis-oxygenated-gonane, as defined in claim 1, having the chemical name 17β-acetoxy-13-cyclopentyl-gona-4-ene-3-one.

22. The 3,17-bis-oxygenated-gonane, as defined in claim 1, having the chemical name 13-cyclopentyl-gona-5(10)-ene-17β-ol-3-one.

23. The 3,17-bis-oxygenated-gonane, as defined in claim 1, having the chemical name 17β-acetoxy-13-cyclopentyl-gona-5(10)-ene-17β-ol-3-one.

* * * * *